US012776798B2

(12) United States Patent
Lee et al.

(10) Patent No.: US 12,776,798 B2
(45) Date of Patent: Oct. 27, 2026

(54) ELECTRONIC DEVICE AND METHOD FOR TRANSMITTING INFORMATION RELATED TO CHARGE OF BATTERY IN ELECTRONIC DEVICE

(71) Applicant: SAMSUNG ELECTRONICS CO., LTD., Suwon-si (KR)

(72) Inventors: Changho Lee, Suwon-si (KR); Kwangtaek Woo, Suwon-si (KR); Jaeho Choi, Suwon-si (KR); Seonghun Kim, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 18/823,122

(22) Filed: Sep. 3, 2024

(65) Prior Publication Data

US 2024/0429958 A1 Dec. 26, 2024

Related U.S. Application Data

(63) Continuation of application No. PCT/KR2023/001198, filed on Jan. 26, 2023.

(30) Foreign Application Priority Data

Mar. 2, 2022 (KR) ........................ 10-2022-0026548
Mar. 17, 2022 (KR) ........................ 10-2022-0033560

(51) Int. Cl.
*H04B 7/00* (2006.01)
*G06F 1/3212* (2019.01)
(Continued)

(52) U.S. Cl.
CPC ......... *H04B 1/3827* (2013.01); *G06F 1/3212* (2013.01); *H04R 1/10* (2013.01)

(58) Field of Classification Search
CPC . H04B 1/3827; H04M 1/72412; G06F 1/3212
See application file for complete search history.

(56) References Cited

U.S. PATENT DOCUMENTS 11,890,962 B1 * 2/2024 Govan .................... B60L 58/12
2006/0135218 A1 6/2006 Son et al.
(Continued)

FOREIGN PATENT DOCUMENTS

JP 2021-028588 A 2/2021
KR 10-0585705 B1 6/2006
(Continued)

OTHER PUBLICATIONS

International Search Report (PCT/ISA/210) issued by the International Searching Authority on Apr. 26, 2023 in corresponding International Application No. PCT/KR2023/001198.
(Continued)

*Primary Examiner* — Tuan Pham
(74) *Attorney, Agent, or Firm* — Sughrue Mion, PLLC

(57) ABSTRACT

An electronic device and method identifies a charging status, and based on the charging status satisfying a designated condition, identifies whether short-range wireless communication is connected with a designated external device. Based on identifying that the connection of the short-range wireless communication with the designated external device is released, the electronic device transmits a request for establishing a connection of the short-range wireless communication to the designated external device. Based on the connection of the short-range wireless communication with the designated external device being established, the electronic device transmits charging-related information to the designated external device through the communication circuitry.

20 Claims, 14 Drawing Sheets

(51) Int. Cl.
*H04B 1/3827* (2015.01)
*H04R 1/10* (2006.01)

(56) References Cited

U.S. PATENT DOCUMENTS

| | | | | |
|---|---|---|---|---|
| 2013/0116015 | A1* | 5/2013 | Lee | H04M 1/05 455/569.1 |
| 2013/0332756 | A1 | 12/2013 | Kim et al. | |
| 2015/0054458 | A1 | 2/2015 | Yoon et al. | |
| 2016/0301791 | A1 | 10/2016 | Kim et al. | |
| 2017/0164089 | A1 | 6/2017 | Lee et al. | |
| 2019/0081499 | A1* | 3/2019 | Sun | H02J 50/40 |
| 2019/0140469 | A1 | 5/2019 | Lee | |
| 2019/0200113 | A1 | 6/2019 | Kim et al. | |
| 2019/0334360 | A1 | 10/2019 | Colosimo et al. | |
| 2020/0052516 | A1 | 2/2020 | Colosimo et al. | |
| 2023/0187948 | A1 | 6/2023 | Jin et al. | |

FOREIGN PATENT DOCUMENTS

| | | | |
|---|---|---|---|
| KR | 10-2015-0021803 | A | 3/2015 |
| KR | 10-2016-0120551 | A | 10/2016 |
| KR | 10-2017-0010475 | A | 2/2017 |
| KR | 10-2017-0039568 | A | 4/2017 |
| KR | 10-2017-0067050 | A | 6/2017 |
| KR | 10-2017-0127885 | A | 11/2017 |
| KR | 10-2018-0113715 | A | 10/2018 |
| KR | 10-2019-0078949 | A | 7/2019 |
| KR | 10-1984970 | B1 | 9/2019 |
| KR | 10-2020-0079461 | A | 7/2020 |
| KR | 10-2277821 | B1 | 7/2021 |
| KR | 10-2298749 | B1 | 9/2021 |
| KR | 10-2022-0022707 | A | 2/2022 |

OTHER PUBLICATIONS

Written Opinion (PCT/ISA/237) issued by the International Searching Authority on Apr. 26, 2023 in corresponding International Application No. PCT/KR2023/001198.

Communication dated Apr. 28, 2025, issued by European Patent Office in European Patent Application No. 23763623.8.

Office Action dated May 27, 2026, issued by Korean Ministry of Intellectual Property in Korean Patent Application No. 10-2022-0033560.

* cited by examiner

ELECTRONIC DEVICE AND METHOD FOR TRANSMITTING INFORMATION RELATED TO CHARGE OF BATTERY IN ELECTRONIC DEVICE

CROSS-REFERENCE TO RELATED APPLICATIONS

This application is a continuation application of International Application No. PCT/KR2023/001198 designating the United States, filed on Jan. 26, 2023, in the Korean Intellectual Property Receiving Office and claiming priority to Korean Patent Application No. 10-2022-0026548, filed on Mar. 2, 2022, in the Korean Intellectual Property Office, and Korean Patent Application No. 10-2022-0033560, filed on Mar. 17, 2022, in the Korean Intellectual Property Office, the disclosures of which are incorporated by reference herein in their entireties.

BACKGROUND

1. Field

The disclosure relates to an electronic device a method for transmitting charging-related information about a battery in an electronic device.

2. Description of Related Art

Bluetooth communication technology may suggest a short-range wireless communication technology that enables electronic devices to be connected to each other for exchanging data or information. Bluetooth communication technology may have Bluetooth legacy (or classic) communication technology or Bluetooth low energy (BLE) communication technology and have various kinds of topology, such as piconet or scatternet.

Recently in wide use are electronic devices adopting Bluetooth communication technology. In particular, a pair of earbuds that may be respectively worn on both ears of the user are widely used as an ear-wearable device. An ear-wearable device may provide various functions. For example, an ear-wearable device may include a microphone to identify the user's voice, thereby transmitting data for the user's voice to an electronic device (e.g., a smartphone). Further, the ear-wearable device may include a speaker to output the audio data received from an electronic device (e.g., a smartphone) to through the speaker.

The ear-wearable device may include a master earbud (e.g., the right earbud) and a slave earbud (e.g., the left earbud) that may be connected to an electronic device (e.g., a smart phone). The master earbud may transmit voice data to the electronic device through connection with the electronic device, and the electronic device may transmit audio data (or audio content) to the master earbud. The master earbud may transfer audio data (or audio content) received from the electronic device through wireless communication to the slave earbud and may output the audio data through the speaker. The slave earbud may be synchronized with the master earbud, outputting the audio data transferred from the master earbud or electronic device through the speaker.

The master earbud and the slave earbud (hereinafter referred to as 'earbuds') may be connected to the electronic device based on Bluetooth communication to perform the above operations. To that end, the earbuds may perform a pairing operation including an inquiry and/or an inquiry scan operation, or a BLE advertising and/or BLE scan operation.

SUMMARY

According to one or more embodiments, a wearable device (or smart device) (e.g., earbuds, watch-type device, or glasses-type device) connected through short-range wireless communication (e.g., Bluetooth communication) may transmit various pieces of information to an external electronic device (e.g., smartphone) through the short-range wireless communication. For example, the wearable device may transmit charging-related information (e.g., full charge information or discharge information) to the external electronic device. The external electronic device may display the charging-related information received from the wearable device through a display (e.g., touchscreen) provided in the external electronic device.

When the wearable device is not connected to the external electronic device (e.g., when the wearable device is being charged or is mounted on the cradle), the charging-related information about the wearable device may be difficult to identify on the external electronic device (e.g., smartphone). For example, in a case where the wearable device is not connected to the external electronic device when the battery of the wearable device has been discharged or fully charged, it may be difficult for the external electronic device to identify the charging status of the wearable device.

One or more embodiments may provide an electronic device that may provide charging-related information about a wearable device through an external electronic device by connecting to the external electronic device when a charging-related event occurs or a situation where it is required to indicate the charging status occurs while the wearable device is not connected to the external electronic device and a method for transmitting charging-related information about a battery in the electronic device.

According to an aspect of the disclosure, there is provided an electronic device including: a communication circuitry; and memory storing instructions; at least one processor electrically connected to the communication circuitry, wherein the instructions, when executed by the at least one processor individually or collectively, cause the electronic device to: identify a charging status; based on the charging status satisfying a designated condition, identify whether short-range wireless communication is connected with a designated external device; based on identifying that the connection of the short-range wireless communication with the designated external device is released, transmit, through the communication circuitry, a request for establishing a connection of the short-range wireless communication to the designated external device; and based on the connection of the short-range wireless communication with the designated external device being established, transmit charging-related information to the designated external device through the communication circuitry.

The instructions, when executed by the at least one processor, may cause the electronic device to: identify a charging-related event; and identify the charging status based on the identified charging-related event.

The electronic device may be configured to be worn on an ear or on a wrist.

The instructions, when executed by the at least one processor, may cause the electronic device to identify that the connection of the short-range wireless communication is released in a state in which the electronic device is mounted on a cradle.

The instructions, when executed by the at least one processor, may cause the electronic device to enable the electronic device to transmit a request for establishing a connection of short-range wireless communication to the designated external device through the cradle.

The short-range wireless communication may include at least one of Bluetooth, Bluetooth low energy (BLE), Wi-Fi, or Wi-Fi direct.

The instructions, when executed by the at least one processor, may cause the electronic device to: store identification information about the designated external device; and based on the stored identification information about the designated external device, transmit a request for establishing a connection of short-range wireless communication to the designated external device.

The stored identification information about the designated external device may include at least one of a device name, a universally unique identifier (UUID), or a manufacturer's data.

The instructions, when executed by the at least one processor, may cause the electronic device to identify that the designated condition is satisfied based on the charging status being at least a designated level.

The instructions, when executed by the at least one processor, may cause the electronic device to identify that the designated condition is satisfied based on the charging status being less than or equal to a set level.

The instructions, when executed by the at least one processor, may cause the electronic device to: receive information corresponding to a charging status of a wearable device connected to the electronic device; and based on the received information corresponding to the charging status of the wearable device, identify a charging status of a battery included in the wearable device.

The electronic device may further include a battery, wherein the instructions, when executed by the at least one processor, may cause the electronic device to identify whether the short-range wireless communication is connected with the designated external device based on identifying that a charging status of the battery satisfies a designated condition.

According to an aspect of the disclosure there is provided a method for operating an electronic device and transmitting charging-related information about a battery in the electronic device, the method including: based on identifying that a charging status of the battery satisfies a designated condition, identifying whether short-range wireless communication is connected with a designated external device; based on identifying that the connection of the short-range wireless communication with the designated external device is released, transmitting, through a communication circuitry, a request for establishing a connection of the short-range wireless communication to the designated external device; and based on the connection of the short-range wireless communication with the designated external device being established, transmitting charging-related information about the battery to the designated external device.

The method may include identifying a charging-related event; and identifying the charging status based on the identified charging-related event.

The electronic device may be configured to be worn on an ear or on a wrist.

The method may include identifying that the connection of the short-range wireless communication is released in a state in which the electronic device is mounted on a cradle.

The method may include transmitting a request for establishing a connection of short-range wireless communication to the designated external device through the cradle.

The short-range wireless communication may include at least one of Bluetooth, Bluetooth low energy (BLE), Wi-Fi, or Wi-Fi direct.

The method may include storing identification information about the designated external device; and based on the stored identification information about the designated external device, transmitting a request for establishing a connection of short-range wireless communication to the designated external device.

According to an aspect of the disclosure, a storage medium stores computer-readable instructions which, when executed by at least one processor of an electronic device individually or collectively, cause the electronic device to perform operations. The operations may include identifying whether short-range wireless communication is connected with a designated external device based on identifying that a charging status of a battery satisfies a designated condition. The operations may include transmitting, through a communication circuitry, a request for establishing a connection of the short-range wireless communication to the designated external device, based on identifying that the connection of the short-range wireless communication with the designated external device is released. The operations may include transmitting charging-related information about the battery to the designated external device, based on the connection of the short-range wireless communication with the designated external device being established, According to one or more embodiments, charging-related information about a wearable device is provided through an external electronic device by identifying whether there is a connection to the external electronic device and automatically connecting to it when a charging-related event occurs or a situation where the charging status needs to be indicated occurs while the wearable device is not connected to the external electronic device.

BRIEF DESCRIPTION OF THE DRAWINGS

The above and other aspects and/or features of one or more embodiments of the disclosure will be more apparent from the following detailed description, taken in conjunction with the accompanying drawings, in which.

DETAILED DESCRIPTION

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Figure 1:
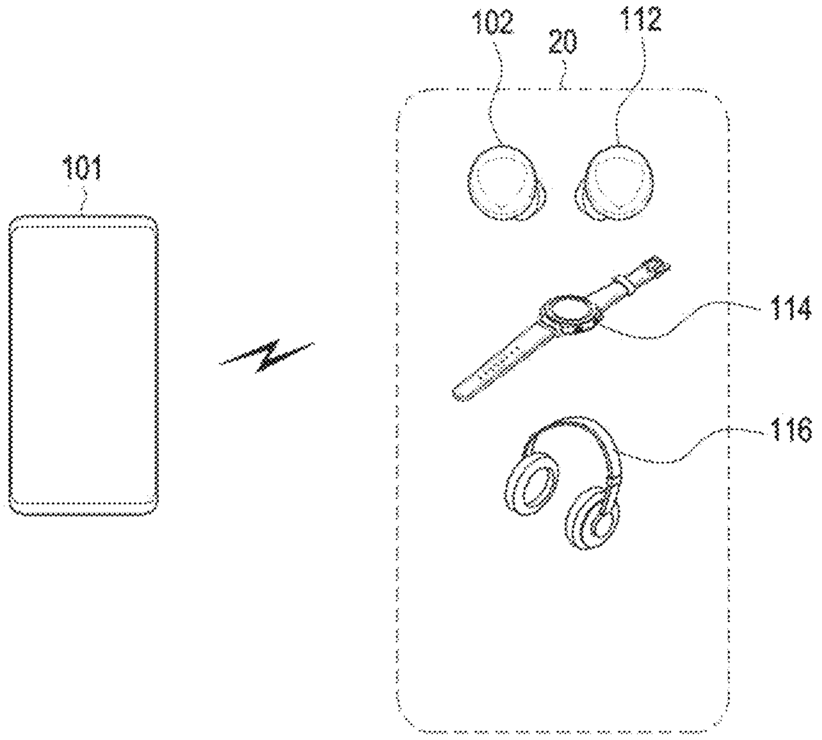
FIG. 1 is a view illustrating an electronic device and an external electronic device according to an embodiment.

FIG. 1 is a view illustrating an electronic device and an external electronic device according to an embodiment.

Referring to FIG. 1, an electronic device 20 (e.g., a wearable device) according to an embodiment may perform a function through a Bluetooth-based communication connection with an external electronic device (e.g., a smartphone). The external electronic device 101 may be a smartphone, and each electronic device 20 may be a wearable device. For example, the wearable device may include a wireless earphone 102 or 112 (ear wearable device), a smart watch 114, a wireless headset 116, or another device capable of communicating with the external electronic device 101 through Bluetooth communication. According to an embodiment, the external electronic device 101 may perform a Bluetooth (or Bluetooth legacy) communication connection through pairing with the electronic device 20. According to an embodiment, the electronic device 101 may share authentication information (e.g., authentication key) during Bluetooth pairing with the external electronic device 20.

Examples of electronic devices according to various embodiments are described below.

Figure 2:
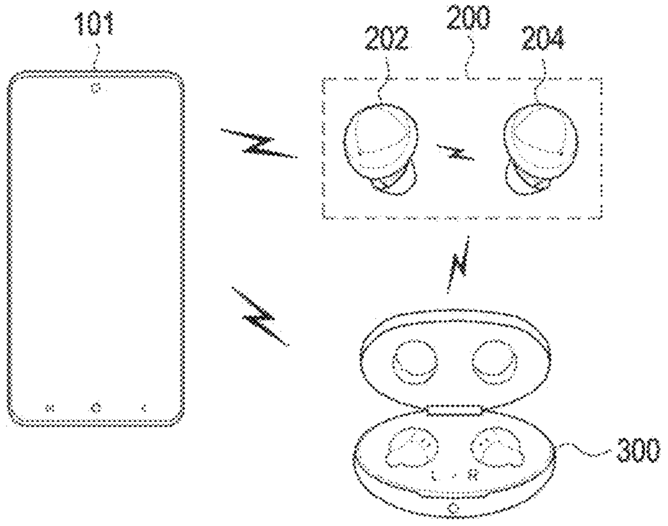
FIG. 2 is a view illustrating an example of connection between a wearable device and an external electronic device according to one or more embodiments.

FIG. 2 is a view illustrating an example of connection between an external electronic device 101 (e.g., a smartphone) and a wearable device 200 according to various embodiments.

Referring to FIG. 2, the user terminal (e.g., the external electronic device 101) may be wirelessly connected to the wearable device 200. The external electronic device 101 may include a smart phone as shown in FIG. 2 but, without limited to those described and/or shown, may be implemented as various types of devices (e.g., notebook computers including standard laptop computers, ultrabooks, netbooks, or tab books, laptop computers, tablet computers, or desktop computers).

According to various embodiments, the wearable device 200 may be implemented as wireless earbuds as shown in FIG. 2 but, without limited to those described and/or shown, may be implemented as various types of devices (e.g., a smart watch, a head-mounted display device, or devices for measuring biometric signals (e.g., heartrate patch)) that may have at least one electrode and a sensor device as described below. According to an embodiment, when the wearable device 200 is wireless earbuds, the wearable device 200 may include a pair of devices (e.g., the first earbud 202 and the second earbud 204). According to an embodiment, the pair of devices (e.g., first earbud 202 and second earbud 204) may be implemented to include the same or similar components (e.g., the components described in connection with FIG. 4).

According to various embodiments, the user terminal (e.g., the electronic device 101) and the wearable device 200 may establish a communication connection with each other and transmit and/or receive data to/from each other. For example, the user terminal (e.g., the external electronic device 101) and the wearable device 200 each may use D2D communication, such as Wi-Fi direct or Bluetooth, (e.g., using a communication circuit supporting the corresponding communication scheme) to establish a communication connection therebetween but, without limited thereto, may use other various types of communication (e.g., a communication scheme, such as Wi-Fi, using access points (APs), a cellular communication scheme using base stations, or a wired communication scheme).

In an embodiment, when the wearable device 200 is wireless earbuds as illustrated, the user terminal (e.g., the external electronic device 101) may establish a communication connection with any one device (e.g., the master earbud) of the pair of devices (e.g., the first earbud 202 and the second earbud 204) but, without limited to those described, establish communication connection with both the pair of devices (e.g., the first earbud 202 and the second earbud 204). In an embodiment, the user terminal (e.g., the external electronic device 101) may communicate with one (e.g., the slave earbud) of the pair of devices (e.g., the first earbud 202 and the second earbud 204) through the other (e.g., the master earbud).

According to various embodiments, when the wearable device 200 is wireless earbuds, the pair of devices (e.g., the first earbud 202 and the second earbud 204) may establish a communication connection therebetween and transmit and/or receive data (e.g., audio data and/or control data) therebetween. The communication connection may be established using D2D communication (e.g., using a communication circuit supporting the corresponding communication), such as Wi-Fi direct or Bluetooth, as described above, but is not limited thereto.

In an embodiment, one of the pair of devices (e.g., the first earbud 202 and the second earbud 204) becomes the master device (or primary device or main device), and the other becomes the slave device (or secondary device). The master device (or main device) may transmit data to the slave device. For example, when the pair of devices (e.g., the first earbud 202 and the second earbud 204) establishes a communication connection therebetween, one of the pair of devices (e.g., the first earbud 202 and the second earbud 204) may randomly be selected as the master device, and the other may randomly be selected as the slave device.

For example, when the pair of devices (e.g., the first earbud 202 and the second earbud 204) establish a communication connection therebetween, the device detected as first worn (e.g., when a value indicating wearing is detected by a wearing detection sensor (e.g., a proximity sensor, a touch sensor, a slope 6-axis sensor, or a 9-axis sensor)) may be selected as the master device, and the other as the slave device. In an embodiment, the master device may transmit the data, received from the user terminal (e.g., the external electronic device 101), to the slave device. For example, the first earbud 202, as the master device, may output audio through the speaker based on the audio data received from the user terminal (e.g., the external electronic device 101) and transmit the audio data to the second earbud 204, as the slave device. In an embodiment, the slave device may receive, through sniffing, the audio data transmitted from the user terminal (e.g., the external electronic device 101) to the master device, based on connection information provided from the master device.

In an embodiment, the first earbud 202, as the master device, may transmit the data (e.g., audio data or control data), received from the second earbud 204, as the slave device, to the user terminal (e.g., the external electronic device 101). For example, when a touch event occurs in the second earbud 204, as the slave device, control data including information about the event may be transmitted to the user terminal (e.g., the external electronic device 101) by the first earbud 202, as the master device. However, without limited to those described the slave device and the user terminal (e.g., the external electronic device 101) may establish a communication connection therebetween as described above, so that the slave device and the user terminal (e.g., the external electronic device 101) may directly perform transmission and/or reception of data therebetween.

In an embodiment, the first earbud 202 and the second earbud 204 may be wiredly and/or wirelessly connected with an electronic device 300 (e.g., a cradle) having one or more storage spaces sized and shaped to correspond to the first earbud 202 and the second earbud 204. In an embodiment, the electronic device 300 may be a cradle or an earbud case for storing and charging the first earbud 202 and the second earbud 204. In an embodiment, the electronic device 300 may establish a communication connection with the first earbud 202 and the second earbud 204 and transmit and/or receive data to/from the first earbud 202 and the second earbud 204. In an embodiment, the electronic device 300 may establish a communication connection with the user terminal (e.g., the external electronic device 101) and transmit and/or receive data to/from the user terminal (e.g., the external electronic device 101). For example, the electronic device 300 may transmit, to the user terminal (e.g., the external electronic device 101), information about the state (e.g., whether operated or not, or charging-related information) of the first earbud 202 and the second earbud 204 and/or the state (e.g., whether the cover is open or closed, whether the first earbud 202 and/or second earbud 204 is stored, or charging-related information about the electronic device 300) of the electronic device 300.

Hereinafter, for convenience of description, a case in which the wearable device 200 is a pair of earbuds 202 and 204 is described, but the following description may also be applied to various types of wearable devices 200 (e.g., smart watches, head-mounted display devices, or devices for measuring biometric signals).

Figure 3A:
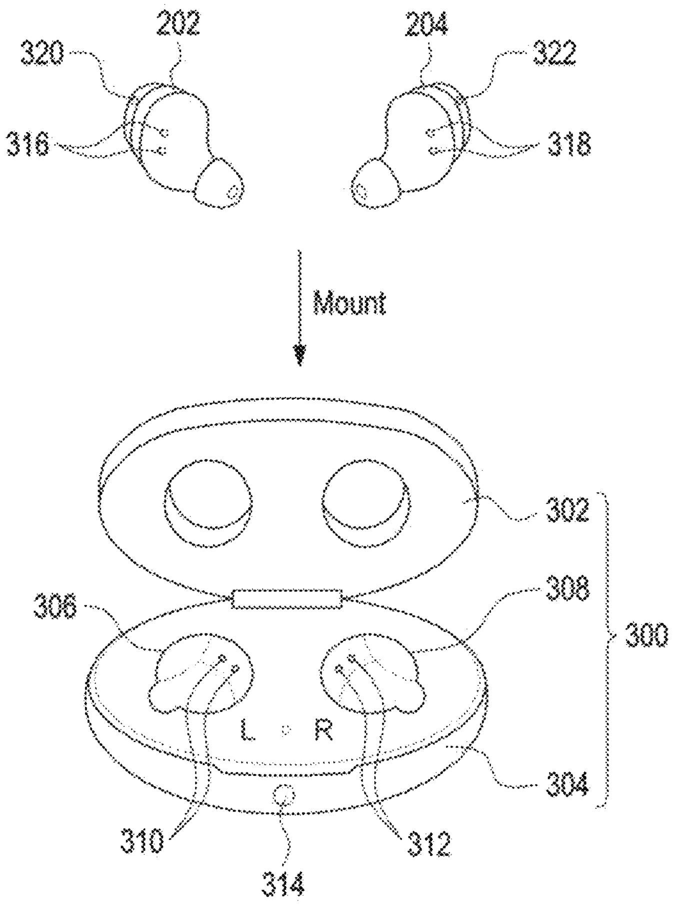
FIG. 3A is a view schematically illustrating a configuration of a wearable device and a cradle according to one or more embodiments.

FIG. 3A is a view schematically illustrating a configuration of a wearable device and a cradle according to various embodiments.

Referring to FIG. 3A, the first earbud 202 and the second earbud 204 may be ear-wearable devices. In an embodiment, when the first earbud 202 and the second earbud 204 are a pair of wireless earphones separate for both ears (e.g., true wireless stereo (TWS)), the first earbud 202 and the second earbud 204 may be connected to each other through short-range wireless communication technology (e.g., Bluetooth legacy or BLE). The first earbud 202 and the second earbud 204 may be, e.g., the wireless earphones 102 and 112, respectively.

In an embodiment, the first earbud 202 and the second earbud 204, respectively, may include a first electric contact 316 and a second electric contact 318 (e.g., the interface 480 as described below) that are used to connect to the electric contacts (e.g., the electric contacts 310 and 312) of the electronic device 300 (e.g., a cradle) to be charged with power. The first electric contact 316 and the second electric contact 318 may be used to connected to the electric contacts (e.g., the electric contacts 310 and 312) of the electronic device 300 (e.g., a cradle) to be charged with power.

In an embodiment, the first earbud 202 and the second earbud 204, respectively, may include a first sensor 320 and a second sensor 322 (e.g., the sensor module 440 as described below) used to determine whether the cover of the electronic device 300 is in an open state or a closed state.

In an embodiment, when the first sensor 320 and the second sensor 322 are magnetic sensors (e.g., hall sensors), the first sensor 320 and the second sensor 322 may identify whether the cover of the electronic device 300 is in the open state or closed state based on whether the strength of the magnetic force detected by the first sensor 320 and/or the second sensor 322 is a threshold or more. The first sensor 320 and/or the second sensor 322 may detect the magnetic force from a magnetic body included in the cover of the electronic device 300. In an embodiment, when the detected magnetic force is the threshold or more, the cover of the electronic device 300 may be identified as being in the closed state and, when the detected magnetic force is less than the threshold, the cover of the electronic device 300 may be identified as being in the open state.

In an embodiment, when the first sensor 320 and the second sensor 322 are light detecting sensors (or illuminance sensors), the first sensor 320 and the second sensor 322 may identify whether the cover of the electronic device 300 is in the open state or closed state based on whether the amount of light detected by the first sensor 320 and/or the second sensor 322 is a threshold or more. In an embodiment, when the detected amount of light is the threshold or more, the cover of the electronic device 300 may be identified as being in the open state and, when the detected amount of light is less than the threshold, the cover of the electronic device 300 may be identified as being in the closed state.

The electronic device 300 may be used for storing and/or charging at least one or both of the first earbud 202 and the second earbud 204 and may include a cover 302 and a body 304. The body 304 of the electronic device 300 may include a first mounting unit 306 and a second mounting unit 308 on which the first earbud 202 and the second earbud 204, respectively, may be mounted as shown in FIG. 3A.

The first mounting unit 306 and the second mounting unit 308 may include a third electric contact 310 and a fourth electric contact 312, respectively. The third electric contact 310 and the fourth electric contact 312 may be connected, directly or proximately, to the first electric contact 316 of the first earbud 202 and the second electric contact 318 of the second earbud 204. In an embodiment, when the first electric contact 316 of the first earbud 202 comes in contact with the third electric contact 310, the electronic device 300 may determine that the first earbud 202 is mounted on the first mounting unit 306 of the electronic device 300 and, when the first electric contact 316 of the first earbud 202 comes off the third electric contact 310, the electronic device 300 may detect detachment of the first earbud 202 from the first mounting unit 306 of the electronic device 300. Likewise, when the second electric contact 318 of the second earbud 204 comes in contact with the fourth electric contact 312, the electronic device 300 may determine that the second earbud 204 is mounted on the second mounting unit 308 of the electronic device 300 and, when the second electric contact 318 of the second earbud 204 comes off the fourth electric contact 312, the electronic device 300 may detect detachment of the second earbud 204 from the second mounting unit 308 of the electronic device 300.

Although not shown in FIG. 3A, the electronic device 300 may include a power supply circuit. For example, the electronic device 300 may provide the power, supplied from the outside through a USB port or a charging cable, or the power of the battery mounted in the electronic device 300 to the first earbud 202 and the second earbud 204 through the third electric contact 310 or the fourth electric contact 312. The first earbud 202 and the second earbud 204 may receive the power, provided from the third electric contact 310 and the fourth electric contact 312, through the first electric contact 316 and the second electric contact 318.

The electronic device 300 may include a sensor (not shown) (e.g., a magnetic sensor) for identifying the open or closed state of the cover 302. The electronic device 300 may identify that the cover 302 is in the open or closed state based on the information identified by the sensor and may provide information indicating that the cover 302 is in the open or closed state to the first earbud 202 or the second earbud 204. The information indicating that the cover 302 is in the open or closed state may be provided to the first earbud 202 or the second earbud 204 based on a request from the first earbud 202 or the second earbud 204.

In an embodiment, the electronic device 300 may communicate with the first earbud 202 and/or the second earbud 204 based on a wired communication scheme using, e.g., local area network (LAN) or a programmable logic controller (PLC), or a wireless communication scheme using Bluetooth legacy or BLE communication technology. In an embodiment, the electronic device 300 may communicate with the user terminal (e.g., the external electronic device 101) based on a wireless communication scheme using, e.g., Bluetooth legacy or BLE communication technology. Accordingly, the electronic device 300 may include a communication interface for wired communication or wireless communication.

Figure 3B:
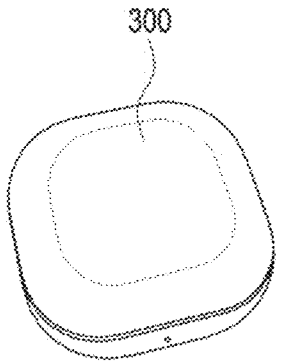
FIGS. 3B and 3C are views illustrating a state in which a wearable device is mounted on a cradle according to one or more embodiments.
Figure 3C:
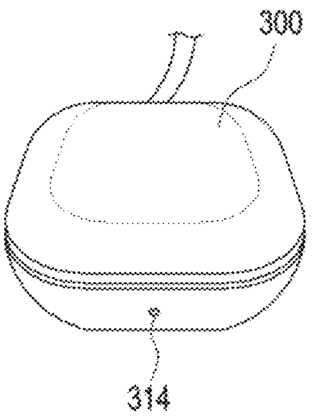

FIGS. 3B and 3C are views illustrating a state in which a wearable device is mounted on a cradle according to various embodiments.

Referring to FIGS. 3B and 3C, when the wearable device is mounted on the electronic device 300 (e.g., a cradle), the wearable device (e.g., the first earbud 202 and/or the second earbud 204) may be mounted inside the electronic device 300 to be included in a closed space. The wearable device (e.g., the first earbud 202 and/or the second earbud 204) may communicate with the external electronic device 101 directly inside the electronic device 300 or through the electronic device 300. According to various embodiments, when the wearable device (e.g., the first earbud 202 and/or the second earbud 204) is mounted inside the electronic device 300 to be included in the closed space, communication (e.g., short-range wireless communication) with the external electronic device 101 may be disconnected, failing to transmit information (e.g., charging-related information) about the wearable device to the external electronic device 101. For example, the information (e.g., charging-related information) about the wearable device (e.g., the first earbud 202 and/or the second earbud 204) may be transmitted to the electronic device 300, and the electronic device 300 may display a charging status through a light emitting diode (LED) 314 disposed on the housing.

According to various embodiments, when the wearable device is mounted in the electronic device 300, and the cover 302 is closed, communication connection between the wearable device and the external electronic device 101 (e.g., a smartphone) is in a disconnected state, so that charging-related information may not be transferred, causing the user to identify whether the wearable device is charged through the external electronic device 101 (e.g., a smartphone).

Figure 4:
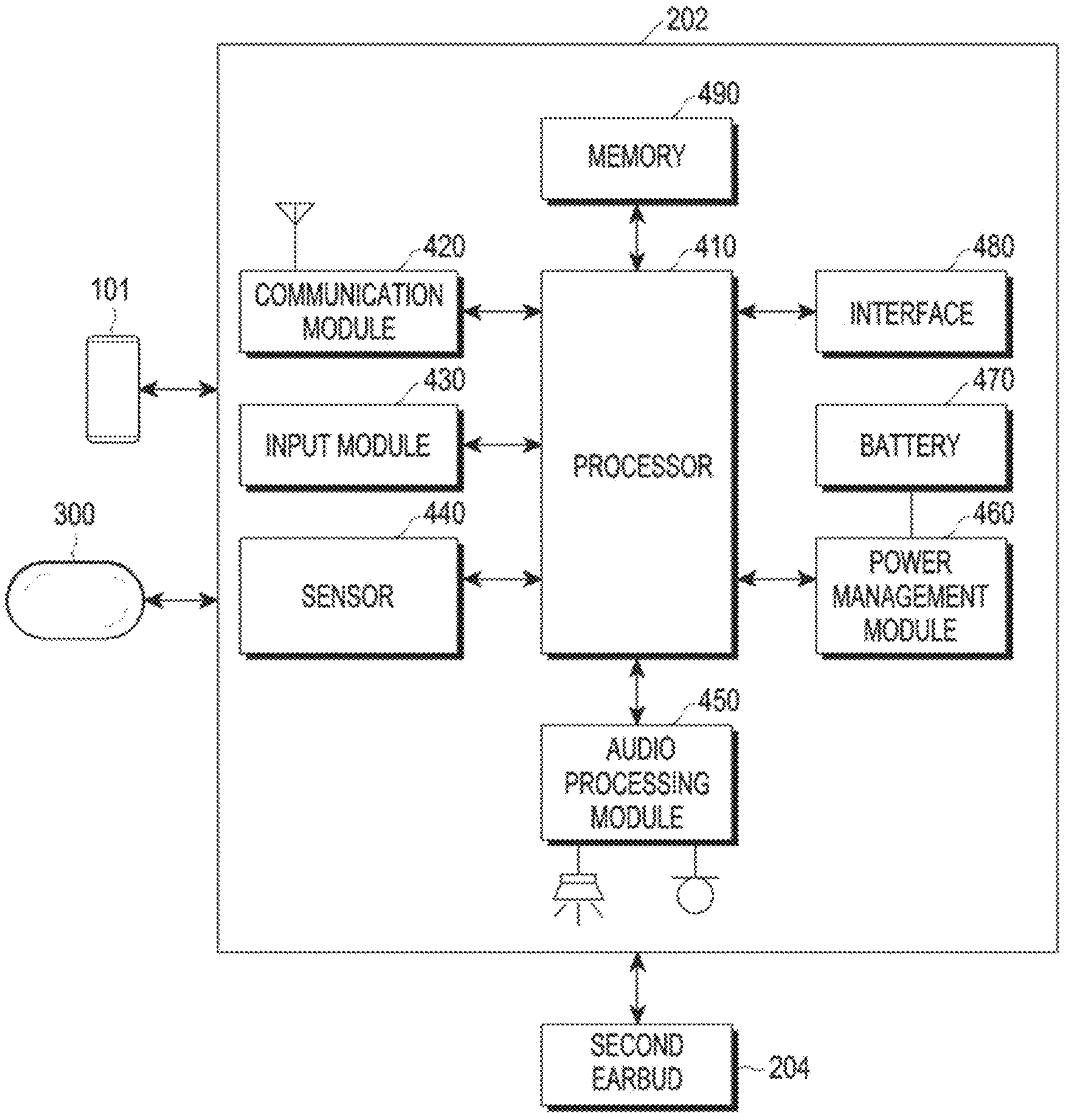
FIG. 4 is a block diagram illustrating a configuration of a first earbud according to one or more embodiments.

FIG. 4 is a block diagram illustrating a configuration of a first earbud 202 according to various embodiments. In an embodiment, the first earbud 202 may be a master earbud that may be connected with the external electronic device 101 (e.g., a smart phone) shown in FIG. 1, and the second earbud 204 may be a slave earbud that may be connected to the master earbud.

The first earbud 202 may include the same or similar components to at least one of the components (e.g., modules) of the electronic device 1401 illustrated in FIG. 14 described below. The first earbud 202 may include a communication module 420, an input module 430, a sensor 440, an audio processing module 450, memory 490, and a power management module 460, a battery 470, an interface 480, and/or a processor 410.

According to various embodiments, the communication module 420 may include at least one of a wireless communication module (e.g., a Bluetooth communication module, a cellular communication module, a wireless-fidelity (Wi-Fi) communication module, a near-field communication (NFC) communication module, or a global navigation satellite system (GNSS) communication module) or a wired communication module (e.g., a local area network (LAN) communication module or a power line communication (PLC) communication module).

The communication module 420 may directly or indirectly perform communication with at least one of the external electronic device 101 (e.g., a smartphone), the electronic device 300 (e.g., a cradle), or the second earbud 204 (e.g., a slave earbud) through the first network, using at least one communication module. The second earbud 204 may be a component of the ear-wearable device 200 configured as a pair with the first earbud 202. The communication module 420 (e.g., communicator, communication interface or communication circuitry) may include one or more communication processors that are operable independently from the processor 410 and supports wired or wireless communication.

According to various embodiments, the communication module 420 may be connected with one or more antennas for transmitting signals or information to another electronic device (e.g., at least one of the electronic device 101, the electronic device 300, or the second earbud 204) or receiving signals or information from the other electronic device. According to an embodiment, at least one antenna appropriate for a communication scheme used in a communication network, such as the first network or the second network, may be selected from the plurality of antennas by, e.g., the communication module 420. The signal or information may then be transmitted or received between the communication module 420 and another electronic device via the selected at least one antenna.

According to various embodiments, the input module 430 may be configured to generate various input signals that may be used for operation of the first earbud 202. The input module 430 may include at least one of a touch pad, a touch panel, or a button. The touch pad may recognize touch inputs in at least one of capacitive, resistive, infrared, or ultrasonic methods. If a capacitive touch pad is provided, physical contact or proximity recognition may be possible. The touch pad may further include a tactile layer. The touch pad including the tactile layer may provide a tactile response to the user. The button may include, e.g., a physical button or an optical key.

According to various embodiments, the input module 430 may generate a user input regarding the turn-on/off of the first earbud 202. According to an embodiment, the input module 430 may receive a user input for a communication connection between the first earbud 202 and the second earbud 204. According to an embodiment, the input module 430 may receive a user input associated with audio data (or audio content). For example, the user input may be associated with functions of starting playback of audio data, pausing playback, stopping playback, adjusting playback speed, adjusting playback volume, or muting. The operation of the first earbud 202 may be controlled by various gestures, such as tapping or swiping up/down the surface on which the touch pad is installed. According to an embodiment, the input module 430 may receive a user input to start pairing between the first earbud 202 and the external electronic device 101. For example, in response to the user input, the processor 410 may operate the first earbud 202 in a pairing mode (e.g., an inquiry scan mode or a BLE advertising scan mode).

According to various embodiments, the sensor 440 may identify the position or operational state of the first earbud 202 or identify whether the cover 302 of the electronic device 300 is in the open or closed state. The sensor 440 may convert measured or identified information into an electric signal. The sensor 440 may include at least one of, e.g., a magnetic sensor, an acceleration sensor, a gyro sensor, a geomagnetic sensor, a proximity sensor, a gesture sensor, a grip sensor, or a biometric sensor. In an embodiment, the sensor 440 may further include an optical sensor. The optical sensor may include a light emitting unit (e.g., a light emitting diode (LED)) that outputs light of at least one wavelength band. The optical sensor may include a light receiving unit (e.g., a photodiode) that receives light of one or more wavelength bands scattered or reflected from an object and generates an electrical signal.

According to various embodiments, the audio processing module 450 may support an audio data gathering function and reproduce the gathered audio data. According to an embodiment, the audio processing module 450 may include an audio decoder (not shown) and a D/A converter (not shown). The audio decoder may convert audio data stored in the memory 490 or received from the external electronic device 101 through the communication module 420 into a digital audio signal. The D/A converter may convert the digital audio signal converted by the audio decoder into an analog audio signal. According to various embodiments, the audio decoder may convert audio data received from the external electronic device 101 through the communication module 420 and stored in the memory 490 into a digital audio signal. The speaker may output the analog audio signal converted by the D/A converter. According to an embodiment, the audio processing module 450 may include an A/D converter (not shown). The A/D converter may convert the analog audio signal transferred through the microphone into a digital voice signal.

According to various embodiments, the audio processing module 450 may play various audio data set in the operation of the first earbud 202. For example, the processor 410 may be designed to detect insertion or removal of the first earbud 202 into/from the user's ear through the sensor 440 and reproduce audio data regarding an effect sound or guide sound through the audio processing module 450. The output of the sound effect or guide sound may be omitted according to the user setting or the designer's intention.

According to various embodiments, the memory 490 may store various data used by at least one component (e.g., the processor 410 or the sensor 440) of the first earbud 202. The various data may include, for example, software and input data or output data for a command related thereto. According to an embodiment, the data may include the audio data received from the external electronic device 101, cover state (e.g., open or closed state) information about the electronic device 300, position information about the second earbud 204 received from the electronic device 300 or the second earbud 204, or role information necessary for connection with the second earbud 204, and information about at least one parameter. The memory 490 may include a volatile memory or a non-volatile memory.

According to various embodiments, the power management module 460 may manage power supplied to the first earbud 202. According to an embodiment, the power management module 460 may be implemented as at least part of, for example, a power management integrated circuit (PMIC). According to an embodiment, the power management module 460 may include a battery charging module. According to an embodiment, if another electronic device (e.g., one of the electronic device 101, the electronic device 300, the second earbud 204, or another electronic device) is electrically connected with the first earbud 202 (wirelessly or wiredly), the power management module 460 may receive power from the other electronic device to charge the battery 470.

According to various embodiments, the battery 470 may supply power to at least one component of the first earbud 202. According to an embodiment, the battery 470 may include, e.g., a rechargeable battery. According to an embodiment, if the first earbud 202 is mounted in the electronic device 300, the first earbud 202 may charge the battery 470 to a previously designated charge level and then power on the first earbud 202 or turn on at least part of the communication circuit (e.g., the communication module 420).

According to various embodiments, the interface 480 may support one or more designated protocols that may be used for the first earbud 202 to directly (e.g., wiredly) connect to the electronic device 101, the electronic device 300, the second earbud 204, or another electronic device. According to an embodiment, the interface 480 may include at least one of, e.g., a high definition multimedia interface (HDMI), a USB interface, an SD card interface, a power line communication (PLC) interface, or an audio interface. According to an embodiment, the interface 480 may include at least one connection port (e.g., the connection ports 316 and 318) for forming a physical connection with the electronic device 300.

According to various embodiments, the processor 410 may execute, e.g., software to control at least one other component (e.g., a hardware or software component) of the first earbud 202 connected with the processor 410 and may process or compute various data. According to an embodiment, as at least part of the data processing or computation, the processor 410 may load a command or data received from another component (e.g., the sensor 440 or communication module 420) onto a volatile memory 490, process the command or the data stored in the volatile memory 490, and store resulting data in a non-volatile memory.

According to an embodiment, the processor 410 may identify whether an electrical connection is formed between the first earbud 202 and the electronic device 300 through the sensor 440 or the interface 480. When an electrical connection is formed between the first earbud 202 and the electronic device 300, the processor 410 may receive position information about the second earbud 204 from the electronic device 300.

According to an embodiment, the processor 410 may recognize the magnetic body installed in the electronic device 300 through the magnetic sensor included in the sensor 440, thereby identifying whether the cover 302 of the electronic device 300 is in the open or closed state.

According to an embodiment, the processor 410 may recognize that the connection port (e.g., the electric contact 316) included in the interface 480 contacts the third electric contact 310 or fourth electric contact 312, thereby identifying whether an electrical connection is formed between the first earbud 202 and the electronic device 300.

According to an embodiment, the processor 410 may form a communication connection with the external electronic device 101 (e.g., a smartphone) through the communication module 420 and receive data (e.g., audio data) from the external electronic device 101 through the formed communication connection. According to an embodiment, the processor 410 may transmit the data, received from the external electronic device 101 through the communication module 420, to the second earbud 204.

According to an embodiment, the processor 410 may perform the operations of the first earbud 202 which are to be described below.

According to various embodiments, the first earbud 202 may further include various modules depending on the form in which it is provided. There are many variations according to the convergence trend of digital devices, so it is not possible to list them all, but components equivalent to the above-mentioned components may be further included in the first earbud 202. Further, it is apparent that in the first earbud 202 according to an embodiment, specific components may be excluded from the above components or replaced with other components according to the form in which it is provided. This will be easily understood by those of ordinary skill in the art.

According to various embodiments, the second earbud 204 configured in pair with the first earbud 202 may include the same or similar components to those included in the first earbud 202 and may perform all or some of the operations of the first earbud 202 described below in connection with the drawings.

Figure 5:
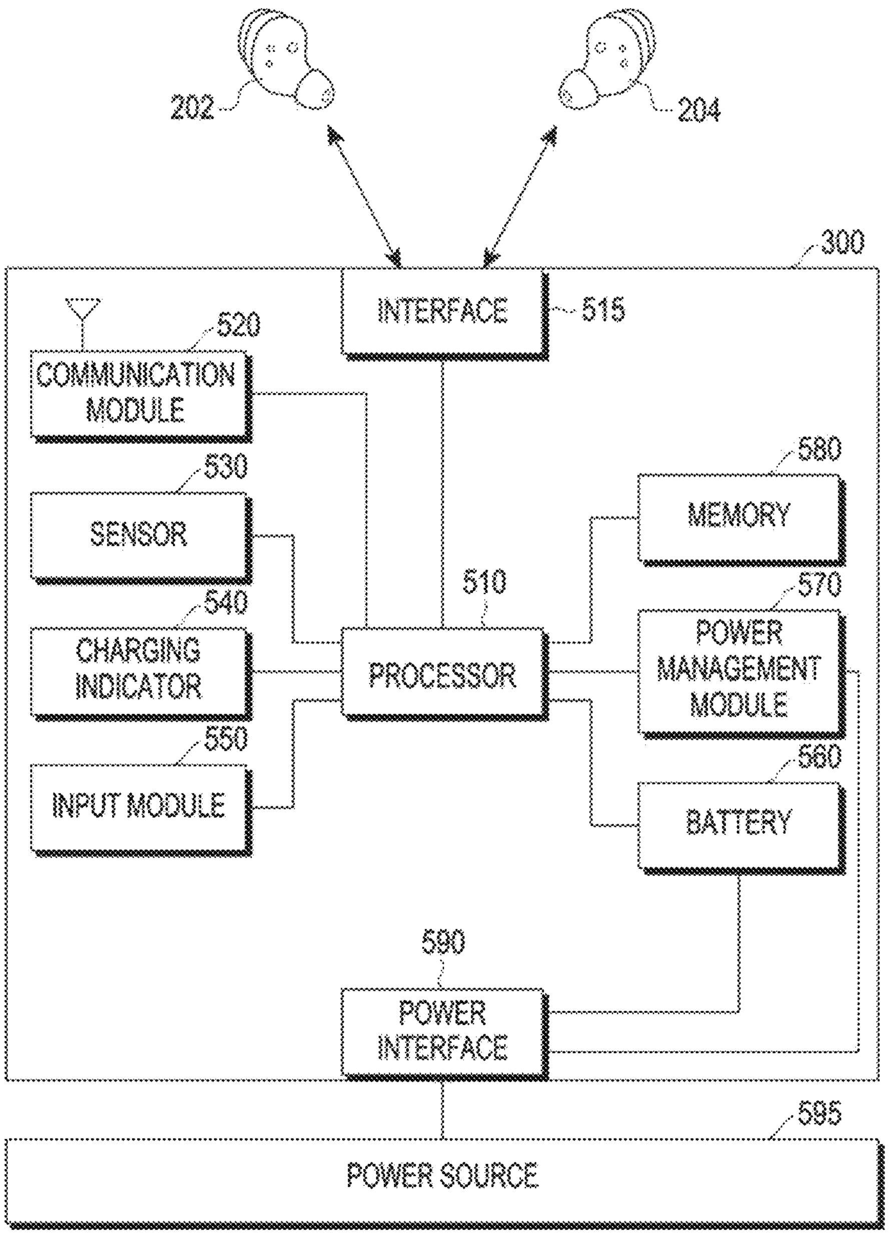
FIG. 5 is a block diagram illustrating a cradle capable of storing a first earbud and a second earbud according to one or more embodiments.

FIG. 5 is a block diagram illustrating an electronic device capable of storing a first earbud 202 and a second earbud 204 according to various embodiments.

According to various embodiments, the electronic device 300 may be a cradle configured to store the first earbud 202 and the second earbud 204. The electronic device 300 may include a processor 510, a communication module 520, a sensor 530, at least one charging indicator 540, an input module 550, an interface 515, a power interface 590, memory 580, a power management module 570, and/or a battery 560.

The processor 510 may execute, e.g., software to control at least one other component (e.g., a hardware or software component) of the electronic device 300 connected with the processor 510 and may process or compute various data. According to an embodiment, as at least part of the data processing or computation, the processor 510 may load a command or data received from another component (e.g., the sensor 530 or communication module 520) onto a volatile memory 580, process the command or the data stored in the volatile memory 580, and store resulting data in a non-volatile memory.

The communication module 520 may include at least one of a wireless communication module (e.g., a cellular communication module, a wireless-fidelity (Wi-Fi) communication module, a Bluetooth communication module, a near-field communication (NFC) communication module, or a global navigation satellite system (GNSS) communication module) or a wired communication module (e.g., a local area network (LAN) communication module or a power line communication (PLC) module). Among the communication modules, the corresponding communication module may communicate with at least one of the external electronic device 101 (e.g., a user terminal) or the earbuds 202 and 204 through the first network or the second network. The communication module 520 may include one or more communication processors that are operable independently from the processor 510 and supports a direct (e.g., wired) communication or a wireless communication.

According to various embodiments, the communication module 520 may be connected with one or more antennas for transmitting signals or power to another electronic device (e.g., the external electronic device 101 or the earbuds 202 and 204) or receiving signals or power from the other electronic device. According to an embodiment, at least one antenna appropriate for a communication scheme used in a communication network, such as the first network (e.g., the first network 1498 of FIG. 14) or the second network (e.g., the second network 1499 of FIG. 14), may be selected from the plurality of antennas by, e.g., the communication module 520. The signal or the power may then be transmitted or received between the communication module 520 and another electronic device via the selected at least one antenna.

In an embodiment, the communication module 520 may be connected to the external electronic device 101 and/or the earbuds 202 and 204 using a wireless communication scheme, such as Bluetooth or Wi-Fi, and may transmit/receive signals or data to/from the external electronic device 101 or may transmit/receive signals or data to/from the earbuds 202 and 204.

According to various embodiments, the sensor 530 may measure a physical quantity or detect an operational state of the electronic device 300. The sensor 530 may convert measured or detected information into an electric signal. The sensor 530 may include at least one of, e.g., an acceleration sensor, a gyro sensor, a geomagnetic sensor, a proximity sensor, a gesture sensor, a grip sensor, an optical sensor, or a biometric sensor. According to an embodiment, the sensor 530 may detect whether one or more of the earbuds 202 and 204 are mounted in the electronic device 300.

According to various embodiments, the sensor 530 may detect an occasion when the cover (e.g., the cover 302) of the electronic device 300 is in the open state and in the closed state. According to an embodiment, the processor 510 may be electrically connected to the sensor 530 and receive a signal indicating that the cover (e.g., the cover 302) is in the open or closed state, from the sensor 530. When one or more of the earbuds 202 and 204 are positioned in the electronic device 300, and the cover (e.g., the cover 302) switches from the closed state to the open state, the processor 510 may generate a signal to turn on the communication circuit (e.g., the communication module 420) of the earbuds 202 and 204 and, when one or more of the earbuds 202 and 204 are positioned in the electronic device 300, and the cover (e.g., the cover 302) switches from the open state to the closed state, the processor 510 may generate a signal to turn off the communication circuit (e.g., the communication module 420) of the earbuds 202 and 204. According to an embodiment, when a charging-related event is identified in the earbuds 202 and 204 in a state in which the cover (e.g., the cover 302) is closed, the sensor 530 may perform short-range wireless communication connection with the external electronic device 101 to be able to transmit charging-related information about the earbuds 202 and 204 to the external electronic device 101 according to embodiments described below.

According to various embodiments, the at least one charging indicator 540 may indicate the charge level of the battery 560 and/or the batteries (e.g., the battery 470) of the earbuds 202 and 204. Through the charging indicator 540 on the surface of the electronic device 300, the user may identify the amount of charge of the battery 560 of the electronic device 300 or the amount of charge of the batteries (e.g., the battery 470) of the earbuds 202 and 204. The charging indicator 540 may be implemented as a display or may be implemented as a light emitting diode (LED).

According to various embodiments, the input module 550 may be configured to generate various input signals that may be used for operation of the electronic device 300. The input module 550 may include at least one of a touch pad, a touch panel, or a button. The touch pad may recognize touch inputs in at least one of capacitive, resistive, infrared, or ultrasonic methods. If a capacitive touch pad is provided, physical contact or proximity recognition may be possible. The touch pad may further include a tactile layer. The touch pad including the tactile layer may provide a tactile response to the user. The button may include, e.g., a physical button or an optical key. According to an embodiment, the processor 510 may detect the user's intent to support pairing of the earbuds 202 and 204 through the input module 550 and determine to transmit a pairing support signal for the earbuds 202 and 204.

According to various embodiments, the interface 515 may support one or more designated protocols to be used for the electronic device 300 to be wiredly or wirelessly connected with the earbuds 202 and 204. According to an embodiment, the interface 515 may include at least one of, e.g., a high definition multimedia interface (HDMI), a USB interface, an SD card interface, a PLC interface, or an audio interface. According to an embodiment, the interface 515 may include at least one connection port (e.g., the electric contacts 310 and 312) for forming a physical connection with the earbuds 202 and 204. In an embodiment, the interface 515 may include at least one connection port (e.g., the electric contacts 310 and 312) that may physically contact the electric contact (e.g., the electric contact 316) of the first earbud 202 and the electric contact (e.g., the electric contact 318) of the second earbud 204.

According to various embodiments, the processor 510 may identify whether a physical connection is formed between the electronic device 300 and the earbuds 202 and 204 through the interface 515. According to an embodiment, if the processor 510 identifies a physical contact between the electronic device 300 and the earbuds 202 and 204 through the interface 515, the processor 510 may generate a charging signal that initiates charging of the earbuds 202 and 204. According to an embodiment, the processor 510 may identify, through the interface 515, that either or both of the earbuds 202 and 204 have been removed from the electronic device 300, and the processor 510 may generate a removal signal for stopping charging of the removed earbuds 202 and 204. According to an embodiment, the processor 510 may detect that at least one or both of the earbuds 202 and 204 are mounted on the mounting units (e.g., the first mounting unit 306 and the second mounting unit 308) provided in the housing of the electronic device 300 through the interface 515 and determine to transmit a pairing support signal for the earbuds 202 and 204.

The power interface 590 may support one or more designated protocols that may be used for the electronic device 300 to directly or wirelessly connect to the power source 595 or the electronic device (e.g., the external electronic device 101). The power interface 590 according to an embodiment may include at least some of a USB connector, a lightening connector, or a receptacle connector for another connector capable of providing power to the electronic device 300. The power interface 590 according to an embodiment may adopt a structure including an antenna to wirelessly receive power from the power source 595 or an electronic device (e.g., the external electronic device 101).

According to various embodiments, the memory 580 may store various data used by at least one component (e.g., the processor 510 or a sensor 530) of the electronic device 300. The various data may include, for example, software and input data or output data for a command related thereto. The memory 580 may include a volatile memory and/or a non-volatile memory.

According to various embodiments, the memory 580 may store setting information related to a Bluetooth communication connection. The configuration information may include at least one of identification information about the electronic device 300 or device information about the earbuds 202 and 204. According to an embodiment, the identification information about the electronic device 300 may include a Bluetooth device address (e.g., BD_ADDR) or LE address information generated based on the Bluetooth device address. According to an embodiment, the identification information for the electronic device 300 may include communication address information (e.g., media access control (MAC) address) about the electronic device 300 or may include unique identification information, such as a serial number, set by the manufacturer of the electronic device 300. The identification information about the electronic device 300 is not limited to the above example and may include information in various formats for identifying the electronic device 300.

According to an embodiment, the device information about the earbuds 202 and 204 may include a Bluetooth device address (e.g., BD_ADDR) of at least one or both thereof or LE address information generated based on the Bluetooth device address. According to an embodiment, the device information may further include device type information about at least one or both of the earbuds 202 and 204. The device type information may indicate either a master role or a slave role. According to an embodiment, each Bluetooth device address may be a Bluetooth device address in one of various formats. According to an embodiment, the device information may include identification information (e.g., MAC address or serial number) in one of various formats capable of identifying at least one or both of the earbuds 202 and 204.

According to an embodiment, the device information may further include, as additional information related to a connection with the first earbud 202 and/or the second earbud 204, at least one of, e.g., a device name, a Bluetooth version, a device class (class of device, CoD), battery level, clock information, current connection status, page scan mode information, transmit power level, service class, at least one universally unique identifier (UUID), or manufacturer's data. In various embodiments of the disclosure, the device address, as information related to a connection with the first earbud 202 and/or the second earbud 204, and information other than the Bluetooth device address may be referred to as additional device information.

In an embodiment, the device information may further include, as additional information related to the connection with the first earbud 202 and/or the second earbud 204, the Bluetooth type (e.g., whether it supports Bluetooth legacy or BLE or both) and/or request information indicating the Bluetooth type (e.g., either Bluetooth legacy or BLE) desired to be used for connection with an external electronic device.

According to various embodiments, the memory 580 may store information regarding use of at least one of a near-field communication (NFC) tag, a radio frequency identification (RFID) tag, a magnetic secure transmission (MST) device, a quick response (QR) code, or a bar code. According to various embodiments, at least one of an NFC tag, an RFID tag, an MST device, a QR code, or a barcode may be included in one of the illustrated components of the electronic device 300 or may be implemented as a separate component in the electronic device 300. At least one of the NFC tag, the RFID tag, the MST device, the QR code, or the barcode may store at least one of the identification information about the electronic device 300 or the device information about the earbuds 202 and 204.

According to various embodiments, the power management module 570 may manage power supplied to the electronic device 300. According to an embodiment, the power management module 570 may be implemented as at least part of, for example, a power management integrated circuit (PMIC). According to an embodiment, the power management module 570 may include a battery charging module (not shown). According to an embodiment, the power management module 570 may wirelessly or wiredly receive power from the power source 595 or the electronic device (e.g., the external electronic device 101) under the control of the processor 510 and charge the battery 560. According to an embodiment, the power management module 570 may wirelessly or wiredly provide the power of the battery 560 to the earbuds 202 and 204 through the interface 515 or at least one antenna of the communication module 520 under the control of the processor 510.

The battery 560 may supply power to at least one component of the electronic device 300. According to an embodiment, the battery 560 may include at least one of, e.g., a primary cell which is not rechargeable, a secondary cell which is rechargeable, or a fuel cell.

According to various embodiments, at least one of the earbuds 202 and 204 may identify at least one of the identification information about the electronic device 300 stored in at least one of the memory 580, the NFC tag, the RFID tag, the MST tag, QR code, or barcode from the electronic device 300 through the communication circuit (e.g., the communication module 420) or the sensor (e.g., the sensor 440) and form a communication connection with the electronic device 300.

According to various embodiments, the electronic device 300 may further include various modules depending on the form in which it is provided. There are many variations according to the convergence trend of digital devices, so it is not possible to list them all, but components equivalent to the above-mentioned components may be further included in the electronic device 300. Further, it is apparent that in the electronic device 300 according to an embodiment, specific components may be excluded from the above components or replaced with other components according to the form in which it is provided. This will be easily understood by those of ordinary skill in the art.

Figure 6A:
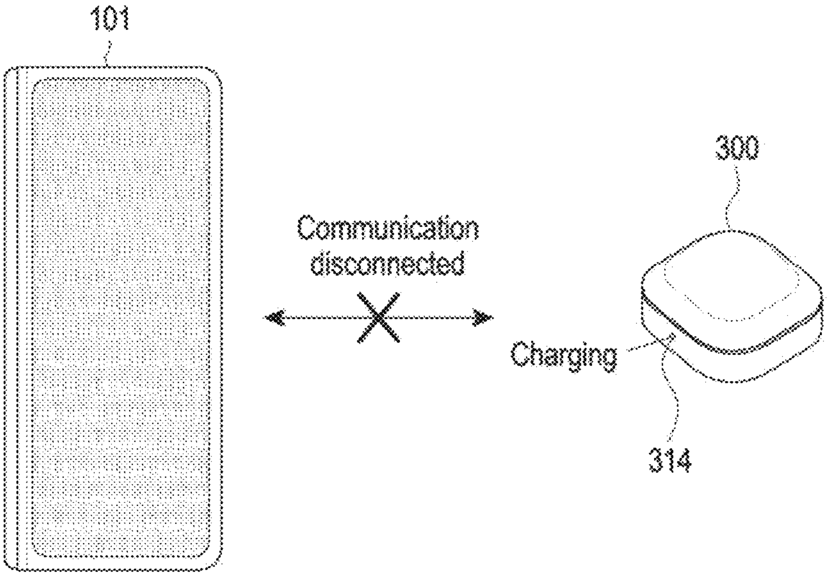
FIG. 6A is a view illustrating a connection state while charging an electronic device according to one or more embodiments.
Figure 6B:
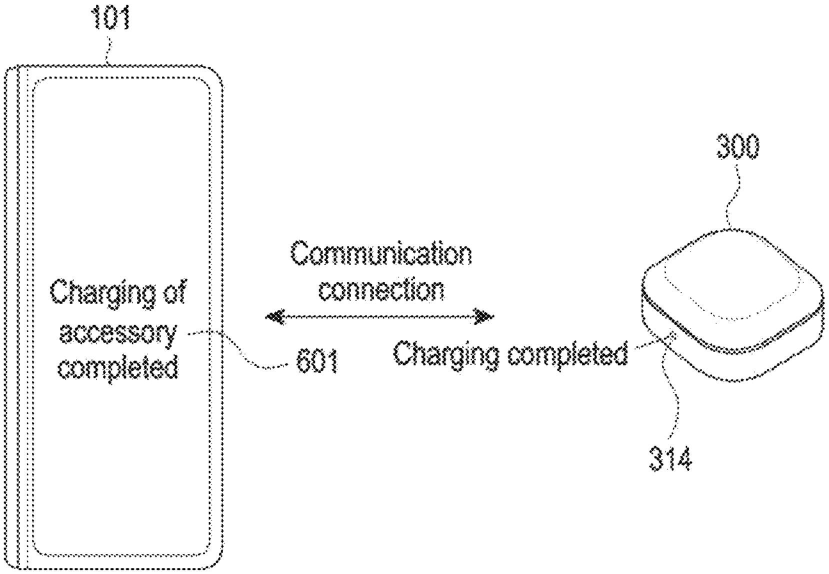
FIG. 6B is a view illustrating a connection with an external electronic device while charging of a battery of an electronic device is completed according to one or more embodiments.

FIG. 6A is a view illustrating a connection state while charging an electronic device according to various embodiments. FIG. 6B is a view illustrating a connection with an external electronic device while charging of a battery of an electronic device is completed according to various embodiments.

According to various embodiments, the wearable device (e.g., the first earbud 202 and/or the second earbud 204) may being charged while being mounted in the electronic device 300. For example, the wearable device (e.g., the first earbud 202 and/or the second earbud 204) may be charged while being mounted in the electronic device 300 regardless of whether the cover 302 of the electronic device 300 is opened or closed.

According to various embodiments, referring to FIGS. 6A and 6B, the wearable device (e.g., the first earbud 202 and/or the second earbud 204) may be charged while being mounted in the electronic device 300 and the cover (e.g., the cover 302) is closed. The electronic device 300 may indicate that the wearable device is being charged through the LED 314 disposed on the housing. For example, the LED 314 may emit red light to indicate that the wearable device is being charged. The communication connection with the external electronic device 101 may be disconnected while the wearable device mounted in the electronic device 300 is being charged. As the communication connection between the wearable device and the external electronic device 101 is disconnected, the external electronic device 101 may have difficulty in identifying the charging status of the wearable device.

According to various embodiments, referring to FIG. 6B, when charging of the wearable device (e.g., the earbuds 202 and 204) is completed, completion of the charging may be indicated through the LED 314 of the electronic device 300 where the wearable device is mounted. For example, the LED 314 may emit green light to indicate that charging of the wearable device is completed. Further, the wearable device may reconnect the disconnected communication with the external electronic device 101 in response to the completion of the charging, transmitting charging-related information about the wearable device to the external electronic device 101. According to various embodiments, the wearable device may reconnect communication with the external electronic device 101 through the electronic device 300 in response to the completion of charging. The external electronic device 101 may receive charging status information about the wearable device through the electronic device 300. As the external electronic device 101 is communicatively connected with the wearable device (e.g., the first earbud 202 and the second earbud 204) or the electronic device 300, the external electronic device 101 may receive the charging status information about the wearable device or the charging status information about the electronic device 300. The external electronic device 101 may identify the charging status information received from the wearable device or the electronic device 300 and display, on the screen 601, charging-related information, such as 'Accessory fully charged.'

Figure 7A:
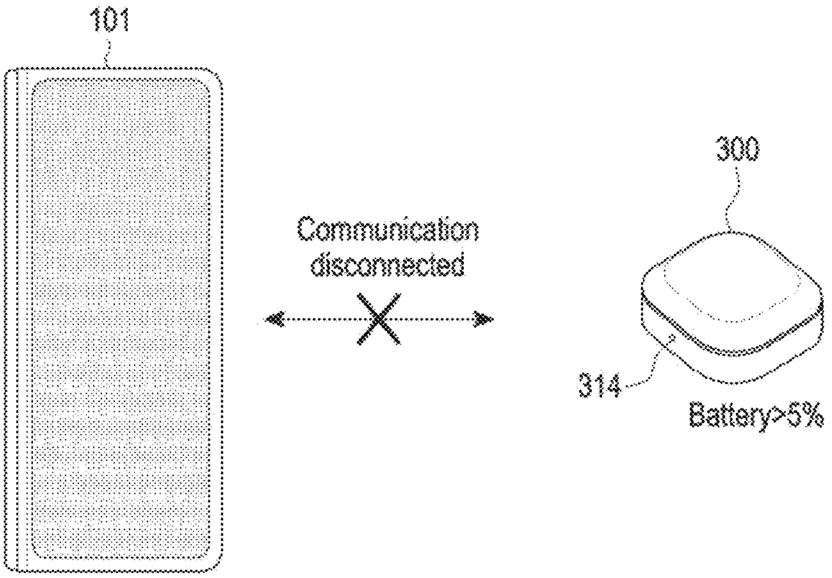
FIG. 7A is a view illustrating a connection state of an electronic device according to one or more embodiments.
Figure 7B:
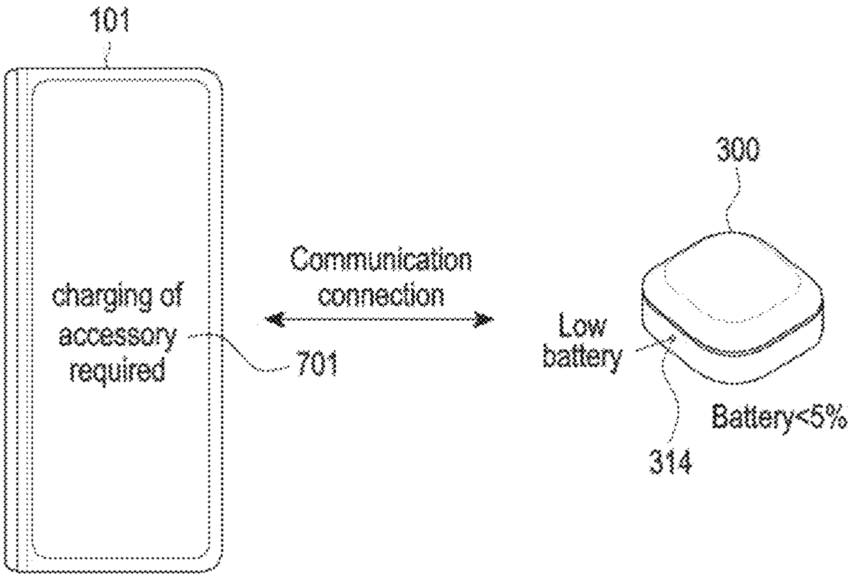
FIG. 7B is a view illustrating a connection to an external electronic device when a battery of an electronic device is discharged according to one or more embodiments.

FIG. 7A is a view illustrating a connection state of an electronic device according to various embodiments. FIG. 7B is a view illustrating a connection to an external electronic device when a battery of an electronic device is discharged according to various embodiments.

According to various embodiments, referring to FIGS. 7A and 7B, the wearable device (e.g., the first earbud 202 and/or the second earbud 204) may be stored while being mounted in the electronic device 300 and the cover (e.g., the cover 302) is closed. The electronic device 300 may indicate that the wearable device is being charged through the LED 314 disposed on the housing. The communication connection with the external electronic device 101 may be disconnected as the wearable device mounted in the electronic device 300 is mounted in the closed space of the electronic device 300. As the communication connection between the wearable device and the external electronic device 101 is disconnected, the external electronic device 101 may have difficulty in identifying the battery status of the wearable device.

According to various embodiments, referring to FIG. 7B, when the battery of the wearable device (e.g., the earbuds 202 and 204) is discharged or reaches a set level or less (e.g., 5% or less), the wearable device may reconnect the communication connection with the external electronic device 101 which has been disconnected in response to the battery being discharged, thereby transmitting charging-related information about the wearable device to the external electronic device 101. According to various embodiments, the wearable device may reconnect communication connection with the external electronic device 101 through the electronic device 300 in response to the battery being discharged. The external electronic device 101 may receive charging-related information (e.g., discharged state information) about the wearable device through the electronic device 300. The external electronic device 101 may be connected via communication to the wearable device (e.g., the first earbud 202 and the second earbud 204) or the electronic device 300 to thereby receive charging-related information (e.g., discharged state information) about the wearable device or charging-related information (e.g., discharged state information) about the electronic device 300. The external electronic device 101 may identify the charging status information received from the wearable device or the electronic device 300 and may display charging-related information such as "Accessory requires charging" on the screen 701.

Figure 8:
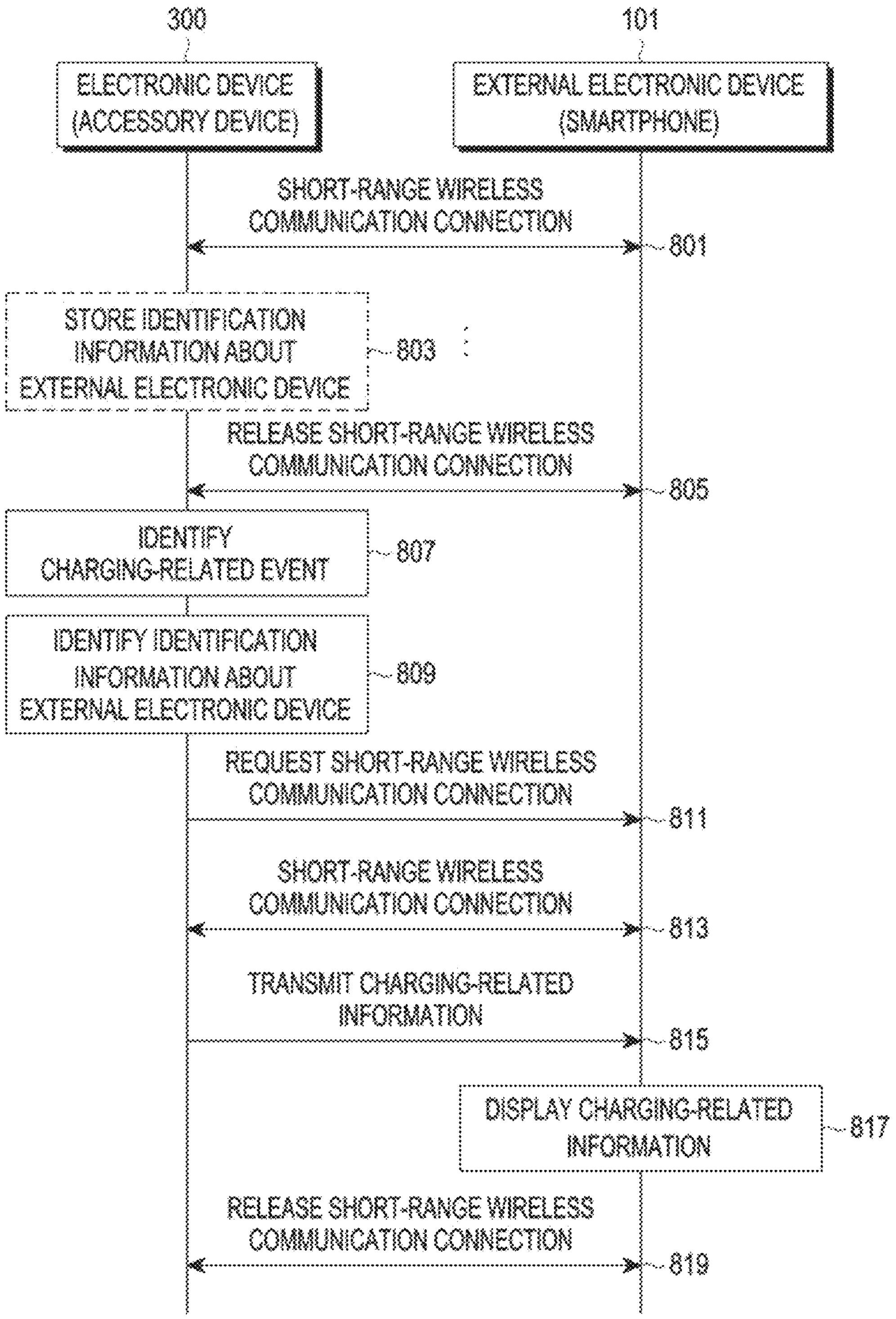
FIG. 8 is a flowchart illustrating operations of an electronic device according to one or more embodiments.

FIG. 8 is a flowchart illustrating operations of an electronic device according to various embodiments. Referring to FIG. 8, an electronic device 300 (e.g., an accessory device or a cradle) may be connected to an external electronic device 101 (e.g., a smartphone) through short-range wireless communication in operation 801. In the following description, the electronic device 300 may include various types of wearable devices (e.g., ear wearable devices, watch-type devices, and glasses-type devices) as well as cradles.

According to various embodiments, the electronic device 300 may store identification information about the external electronic device 101 in operation 803. The external electronic device 101 may be configured as an external electronic device designated by the electronic device 300. The identification information about the external electronic device 101 may include at least one of a device name, a universally unique identifier (UID), or manufacturer's data.

According to various embodiments, when the electronic device 300 does not transmit or receive data to or from the external electronic device 101 for a predetermined time, or when the wearable device is mounted on the cradle and the cradle is closed, in operation 805, the electronic device 300 (e.g., a wearable device or a cradle) may release the short-range wireless communication connection with the external electronic device 101.

According to various embodiments, in operation 807, the electronic device 300 may identify a charging-related event. The charging-related event may include an event corresponding to at least one of a fully charged state of the cradle, a discharged state of the cradle, a fully charged state of the wearable device, or a discharged state of the wearable device. The charging-related event may include an event related to whether the charging status of the cradle is larger than or equal to a first level, the charging status of the cradle is less than or equal to a second level, the charging status of the wearable device is larger than or equal to a third level, and the charging status of the wearable device is less than or equal to a fourth level. The first level and the third level may be the same or different. The second level and the fourth level may be the same or different. The first level, the second level, the third level, and the fourth level may be designated levels or levels set by the user. For example, the first level and/or the third level may be 99%, 95%, and/or 50%, but is not limited thereto. For example, the second level and/or the fourth level may be 0%, 5%, and/or 50%, but is not limited thereto.

According to various embodiments, in response to identifying the charging-related event, the electronic device 300 may identify identification information about the external electronic device 101 in operation 809. The electronic device 300 may request the external electronic device 101 to make a short-range wireless communication connection based on the identified identification information about the external electronic device 101.

According to various embodiments, the electronic device 300 may be connected to the external electronic device 101 through short-range wireless communication in operation 813, and may transmit charging-related information to the external electronic device 101 based on the connected short-range wireless communication in operation 815. The charging-related information transmitted from the electronic device 300 to the external electronic device 101 may include information corresponding to the fully charged state of the cradle, the discharged state of the cradle, the fully charged state of the wearable device, and the discharged state of the wearable device.

According to various embodiments, the external electronic device 101 may receive the charging-related information from the electronic device 300, and may display the received charging-related information on the screen in operation 817. For another example, the external electronic device 101 may output the received charging-related information as an audio signal through a speaker. After the transmission of the charging-related information is completed, the electronic device 300 may release the short-range wireless communication connection with the external electronic device 101 in operation 819.

According to various embodiments, the short-range wireless communication connection between the electronic device 300 and the external electronic device 101 described above may include a pairing operation. For example, in response to identifying the charging-related event, the electronic device 300 may transmit a pairing support signal including device information about the first earbuds 202 and/or the second earbuds 204 to be paired with the external electronic device 101 so that the external electronic device 101 may receive the pairing support signal. In an embodiment, the pairing support signal may be transmitted from the electronic device 300 (e.g., a cradle) to support a Bluetooth connection (e.g., a Bluetooth legacy communication connection or a BLE communication connection) between the external electronic device 101 and the first earbud 202 and/or the second earbud 204.

In an embodiment, the pairing support signal may be an inquiry response packet transmitted to support Bluetooth legacy communication connection between the first earbud 202 and/or the second earbud 204 and the external electronic device 101. The electronic device 300 (e.g., a cradle) may enter an inquiry scan mode in response to identification of the charging-related event and, upon receiving a search signal (e.g., an inquiry packet for Bluetooth legacy communication) transmitted from the external electronic device 101 in the inquiry scan mode, transmit an inquiry response packet including device information about the first earbud 202 and/or the second earbud 204 in response to reception of the inquiry packet. The external electronic device 101 may obtain device information about the first earbud 202 and/or the second earbud 204 from the inquiry response packet, and may connect Bluetooth legacy communication with the first earbud 202 and/or the second earbud 204 using the device information.

In an embodiment, the pairing support signal may be an advertising packet transmitted in the BLE advertising mode to support BLE communication connection between the first earbud 202 and/or the second earbud 204 and the external electronic device 101. The electronic device 300 (e.g., a cradle) may enter the advertising mode for BLE communication in response to identifying the charging-related event, and may transmit an advertising packet including the device information about the first earbud 202 and/or the second earbud 204 in the advertising mode. The external electronic device 101 may obtain the device information about the first earbud 202 and/or the second earbud 204 from the advertising packet, and may connect BLE communication with the first earbud 202 and/or the second earbud 204 using the device information.

Figure 9:
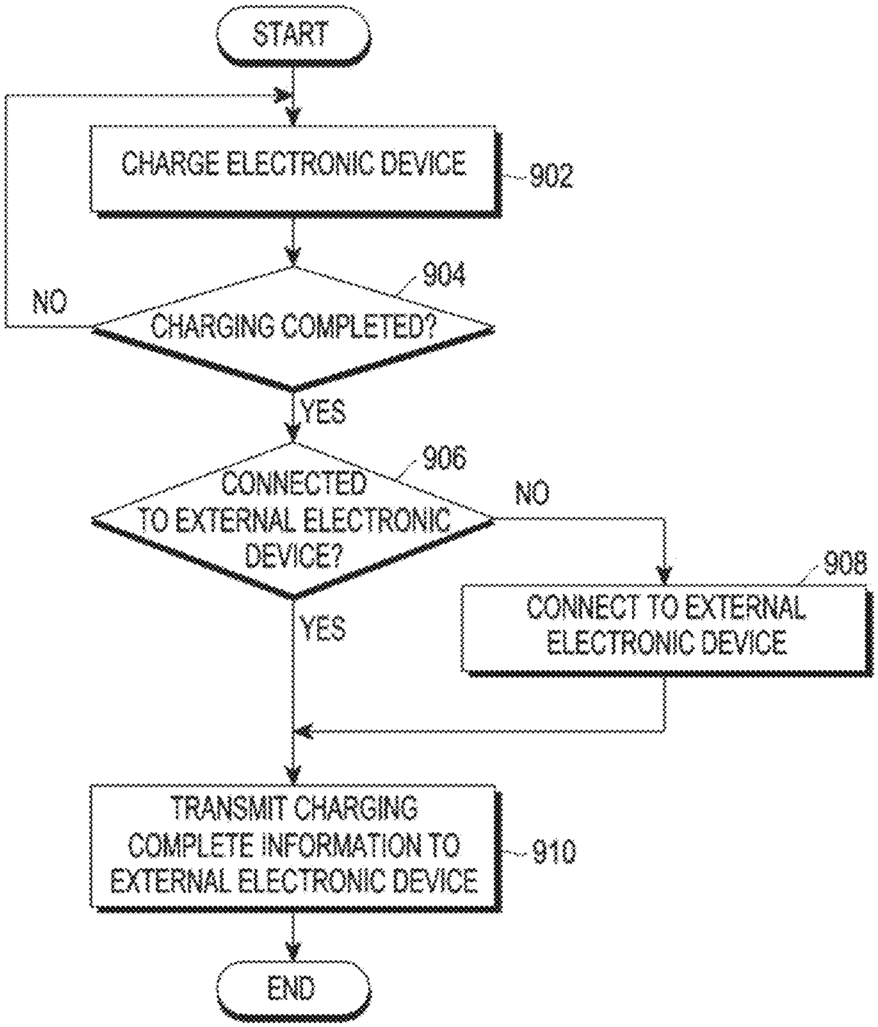
FIG. 9 is a flowchart illustrating operations of an electronic device according to one or more embodiments.

FIG. 9 is a flowchart illustrating operations of an electronic device according to various embodiments.

Referring to FIG. 9, an electronic device (e.g., the electronic device 300 (e.g., a cradle) or the wearable device 200 of FIG. 2) may perform a charging operation in operation 902. When the charging is not completed in operation 904 (No in operation 904), the charging operation in operation 902 may be continuously performed. When it is identified that the charging is completed in operation 904 (Yes in operation 904), the electronic device may identify whether the electronic device is connected to an external electronic device (e.g., the external electronic device 101 (e.g., a smartphone) of FIG. 2) through short-range wireless communication in operation 906. The external electronic device may be a designated electronic device. For example, the designated electronic device may be set as an external electronic device to which the electronic device is most recently connected, or may be an external electronic device set by the user.

According to various embodiments, when it is identified that the electronic device is connected to the external electronic device as a result of the identification (Yes in operation 906), the electronic device may transmit charging complete information to the external electronic device in operation 910. The external electronic device receiving the charging complete information from the electronic device may display the charging complete information about the electronic device through the display.

According to various embodiments, when it is identified that the electronic device is not connected to the external electronic device as a result of the identification (No in operation 906), the electronic device may perform a short-range wireless communication connection procedure with the external electronic device as described above in operation 908. When the short-range wireless communication connection with the external electronic device is completed, the electronic device may transmit charging complete information to the external electronic device in operation 910. The external electronic device receiving the charging complete information from the electronic device may display the charging complete information about the electronic device through the display.

Figure 10:
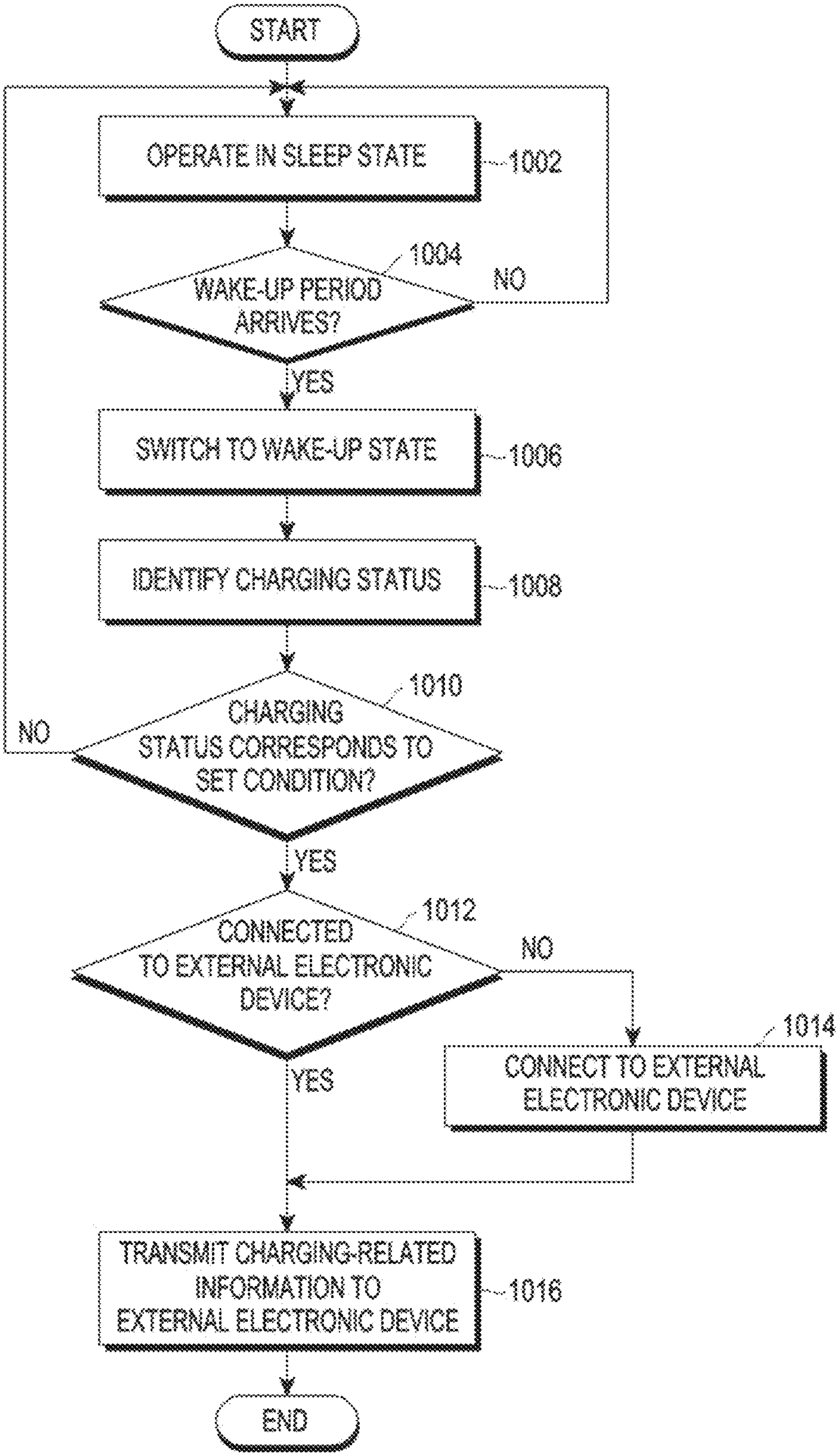
FIG. 10 is a flowchart illustrating operations of an electronic device according to one or more embodiments.

FIG. 10 is a flowchart illustrating operations of an electronic device according to various embodiments.

Referring to FIG. 10, an electronic device (e.g., the electronic device 300 (e.g., a cradle) or the wearable device 200 of FIG. 2) may operate in a sleep state in operation 1002. In operation 1004, the electronic device may identify whether a wake-up period arrives. As a result of the identification, when the wake-up period does not arrive (No in operation 1004), the sleep state of operation 1002 may be maintained. If it is identified that the wake-up period arrives (Yes in operation 1004), the electronic device may switch to the wake-up state in operation 1006.

According to various embodiments, after switching to the wake-up state, the electronic device may identify the charging status in operation 1008. In operation 1010, the electronic device may determine whether the identified charging status corresponds to a set condition. As a result of the determination, when the charging status does not correspond to the set condition (No in operation 1010), the electronic device may operate in the sleep state of operation 1002 again. As a result of the determination, when the charging status corresponds to the set condition (Yes in operation 1010), in operation 1012, it may be identified whether the electronic device is connected to an external electronic device (e.g., the external electronic device 101 (e.g., a smartphone) of FIG. 2) through short-range wireless communication. The external electronic device may be a designated electronic device. For example, the designated electronic device may be set as an external electronic device to which the electronic device is most recently connected, or may be an external electronic device set by the user. According to various embodiments, the case where the charging status corresponds to the set condition may include at least one of the fully charged state of the cradle, the discharged state of the cradle, the fully charged state of the wearable device, and the discharged state of the wearable device.

According to various embodiments, when it is identified that the electronic device is connected to the external electronic device as a result of the identification (Yes in operation 1012), the electronic device may transmit charging-related information (e.g., the fully charged state of the cradle, the discharged state of the cradle, the fully charged state of the wearable device, and the discharged state of the wearable device) to the external electronic device in operation 1016. The external electronic device receiving the charging-related information from the electronic device may display the charging-related information about the electronic device through the display.

According to various embodiments, when it is identified that the electronic device is not connected to the external electronic device as a result of the identification (No in operation 1012), the electronic device may perform a short-range wireless communication connection procedure with the external electronic device as described above in operation 1014. When the short-range wireless communication connection with the external electronic device is completed, the electronic device may transmit charging-related information to the external electronic device in operation 1016. The external electronic device receiving the charging-related related information from the electronic device may display the charging-related information about the electronic device through the display.

Figure 11:
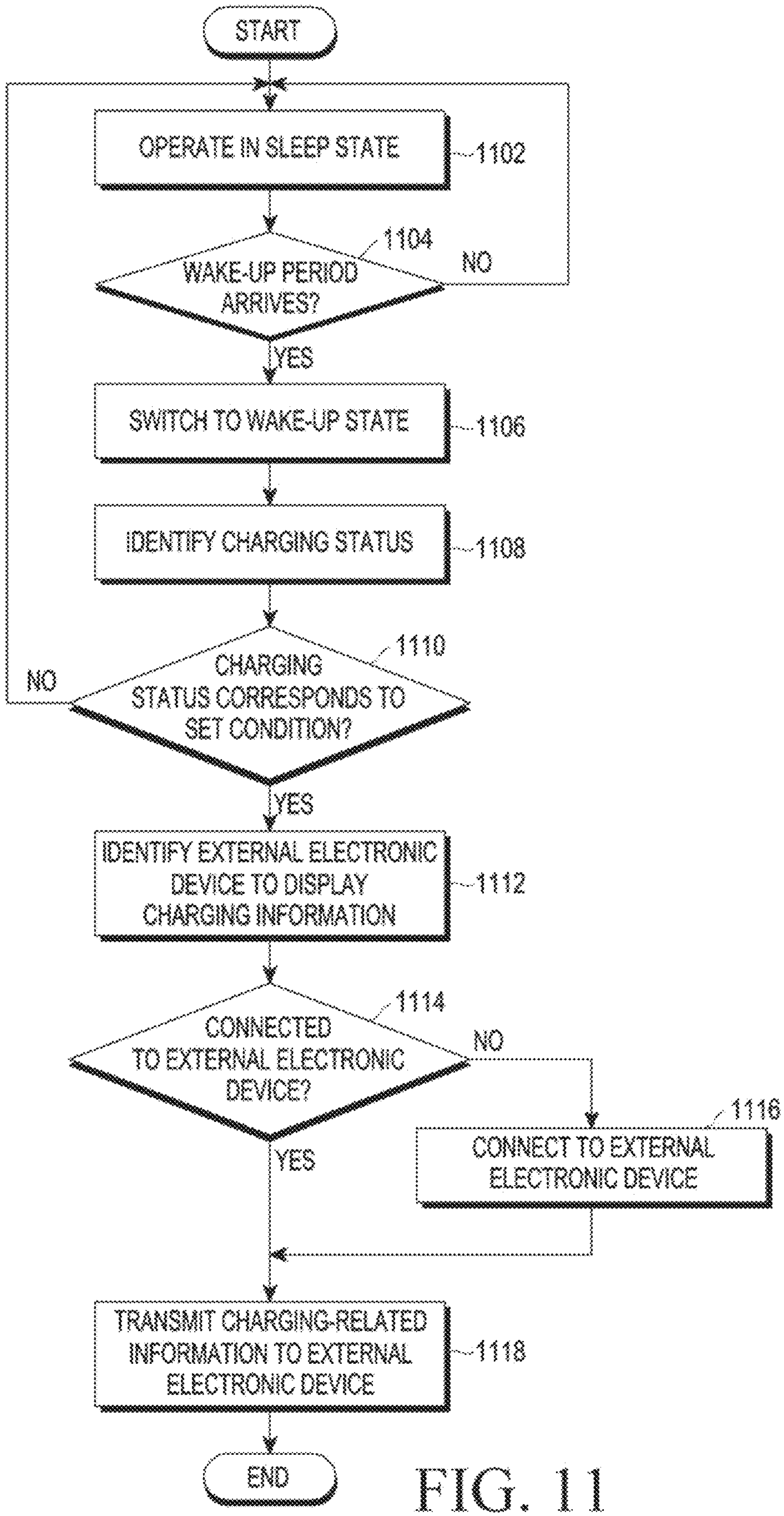
FIG. 11 is a flowchart illustrating operations of an electronic device according to one or more embodiments.

FIG. 11 is a flowchart illustrating operations of an electronic device according to various embodiments.

Referring to FIG. 11, an electronic device (e.g., the electronic device 300 (e.g., a cradle) or the wearable device 200 of FIG. 2) may operate in a sleep state in operation 1102. In operation 1104, the electronic device may identify whether a wake-up period arrives. As a result of the identification, when the wake-up period does not arrive (No in operation 1104), the sleep state of operation 1102 may be maintained. If it is identified that the wake-up period arrives (Yes in operation 1104), the electronic device may switch to the wake-up state in operation 1106.

According to various embodiments, after switching to the wake-up state, the electronic device may identify the charging status in operation 1108. In operation 1110, the electronic device may determine whether the identified charging status corresponds to a set condition. As a result of the determination, when the charging status does not correspond to the set condition (No in operation 1110), the electronic device may operate in the sleep state of operation 1102 again. As a result of the determination, when the charging status corresponds to the set condition (Yes in operation 1110), the external electronic device to display the charging information may be identified in operation 1112. According to various embodiments, the external electronic device to display the charging information may be determined according to whether the user wears (or uses) another wearable device (e.g., a watch-type device or a glasses-type device). For example, when the user is wearing the watch-type device, the external electronic device to display the charging information may be determined as a watch-type device. When the user is not wearing the watch-type device, the external electronic device to display the charging information may be determined as a smartphone interworking with the wearable device. For example, the external electronic device to display the charging information may be determined as a device currently worn by the user or a device being used by the user.

According to various embodiments, in operation 1114, the electronic device may identify whether the electronic device is connected to the determined external electronic device (e.g., the external electronic device 101 (e.g., a smartphone) of FIG. 2) through short-range wireless communication.

According to various embodiments, when it is identified that the electronic device is connected to the external electronic device as a result of the identification (Yes in operation 1114), the electronic device may transmit charging-related information (e.g., the fully charged state of the cradle, the discharged state of the cradle, the fully charged state of the wearable device, and the discharged state of the wearable device) to the external electronic device in operation 1118. The external electronic device receiving the charging-related information from the electronic device may display the charging-related information about the electronic device through the display.

According to various embodiments, when it is identified that the electronic device is not connected to the external electronic device as a result of the identification (No in operation 1114), the electronic device may perform a short-range wireless communication connection procedure with the external electronic device as described above in operation 1116. When the short-range wireless communication connection with the external electronic device is completed, the electronic device may transmit charging-related information to the external electronic device in operation 1118. The external electronic device receiving the charging-related information from the electronic device may display the charging-related information about the electronic device through the display.

Figure 12:
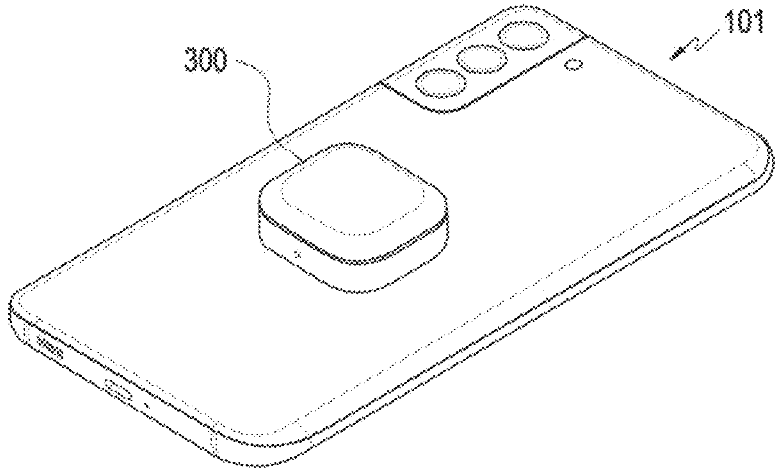
FIG. 12 is a view illustrating an example of charging an electronic device through an external electronic device according to one or more embodiments.

FIG. 12 is a view illustrating an example of charging an electronic device through an external electronic device according to various embodiments.

Referring to FIG. 12, an electronic device 300 (e.g., a cradle) may be disposed on a rear surface of an external electronic device 101 (e.g., a smartphone) to wirelessly receive power. For example, the external electronic device 101 may supply charging power to the electronic device 300 by a resonance scheme or an induction scheme. The electronic device 300 and the external electronic device 101 may perform in-band communication or out-band communication according to a charging scheme standard (e.g., a resonance scheme or an induction scheme). According to various embodiments, the electronic device 300 may wirelessly receive charging power from the external electronic device 101 and report the charging status information to the external electronic device 101 based on a wireless charging protocol while performing charging.

Figure 13:
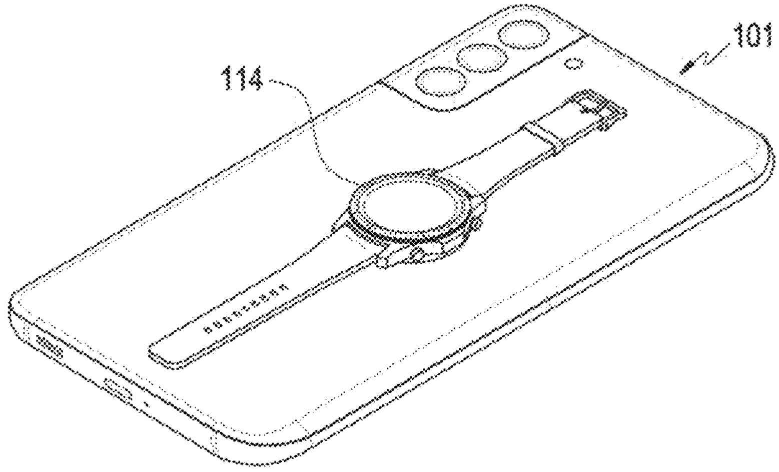
FIG. 13 is a view illustrating an example of charging an electronic device through an external electronic device according to one or more embodiments.

FIG. 13 is a view illustrating an example of charging an electronic device through an external electronic device according to various embodiments.

Referring to FIG. 13, a watch-type device (e.g., a smart watch 114) may be disposed on the rear surface of an external electronic device 101 (e.g., a smart phone) to wirelessly receive power. For example, the external electronic device 101 may supply charging power to the smart watch 114 by a resonance scheme or an induction scheme. The smart watch 114 and the external electronic device 101 may perform in-band communication or out-band communication according to a charging scheme standard (e.g., a resonance scheme or an induction scheme). According to an embodiment, the smart watch 114 may wirelessly receive charging power from the external electronic device 101 and report the charging status information to the external electronic device 101 based on a wireless charging protocol while performing charging. The smart watch 114 may include its own display, and may display the charging status information through its own display.

According to various embodiments, the above-described electronic device 300 (e.g., a cradle), wearable device, or external electronic device 101 (e.g., a smartphone) may be implemented to be the same as or similar to the electronic device 1401 of FIG. 14, which is described below.

Figure 14:
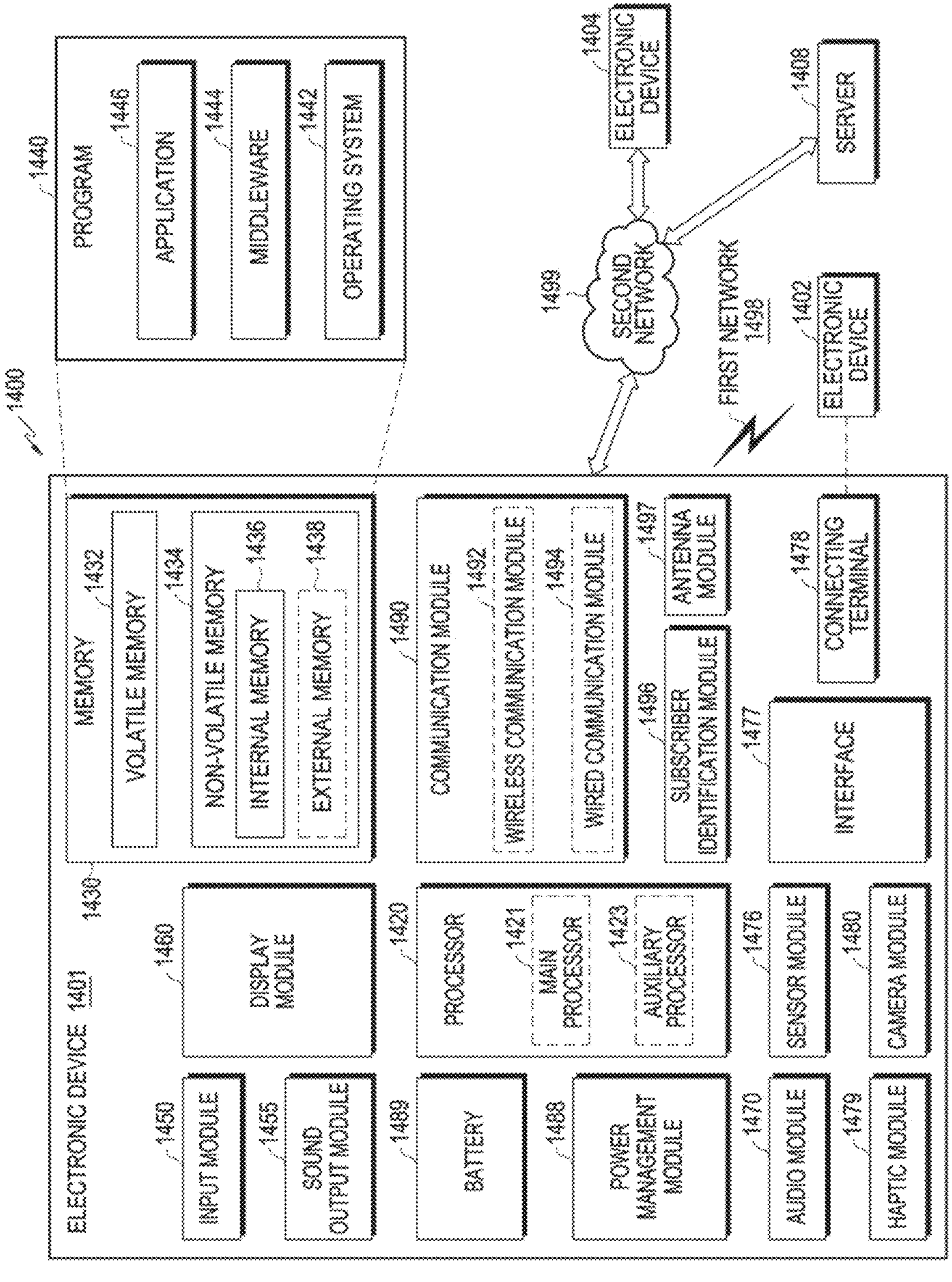
FIG. 14 is a block diagram illustrating an electronic device in a network environment according to one or more embodiments.

FIG. 14 is a block diagram illustrating an electronic device in a network environment according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In an embodiment, at least one (e.g., the connecting terminal 1478) of the components may be omitted from the electronic device 1401, or one or more other components may be added in the electronic device 101. According to an embodiment, some (e.g., the sensor module 1476, the camera module 1480, or the antenna module 1497) of the components may be integrated into a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to an embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1401 includes the main processor 1421 and the auxiliary processor 1423, the auxiliary processor 1423 may be configured to use lower power than the main processor 1421 or to be specified for a designated function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 123. According to an embodiment, the auxiliary processor 1423 (e.g., the neural processing unit) may include a hardware structure specified for artificial intelligence model processing. The artificial intelligence model may be generated via machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by other component (e.g., the processor 1420) of the electronic device 1401, from the outside (e.g., a user) of the electronic device 1401. The input module 1450 may include, for example, a microphone, a mouse, a keyboard, keys (e.g., buttons), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display 1460 may include, for example, a display, a hologram device, or a projector and control circuitry to control a corresponding one of the display, hologram device, and projector. According to an embodiment, the display 1460 may include a touch sensor configured to detect a touch, or a pressure sensor configured to measure the intensity of a force generated by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 101, and then generate an electrical signal or data value corresponding to the detected state. According to an embodiment, the sensor module 1476 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or motion) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device 1404 via a first network 1498 (e.g., a short-range communication network, such as Bluetooth™, wireless-fidelity (Wi-Fi) direct, or infrared data association (IrDA)) or a second network 1499 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1492 may identify or authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device). According to an embodiment, the antenna module 1497 may include one antenna including a radiator formed of a conductor or conductive pattern formed on a substrate (e.g., a printed circuit board (PCB)). According to an embodiment, the antenna module 1497 may include a plurality of antennas (e.g., an antenna array). In this case, at least one antenna appropriate for a communication scheme used in a communication network, such as the first network 1498 or the second network 1499, may be selected from the plurality of antennas by, e.g., the communication module 1490. The signal or the power may then be transmitted or received between the communication module 1490 and the external electronic device via the selected at least one antenna. According to an embodiment, other parts (e.g., radio frequency integrated circuit (RFIC)) than the radiator may be further formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 1401 and the external electronic device 1404 via the server 1408 coupled with the second network 1499. The external electronic devices 1402 or 1404 each may be a device of the same or a different type from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an Internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or health-care) based on 5G communication technology or IoT-related technology.

An electronic device according to various embodiments may comprise a battery, a communication module, and at least one processor electrically connected to the communication module. The at least one processor may be configured to identify a charging status of the battery, identify whether short-range wireless communication with a designated external electronic device (e.g., designated external device) is connected based on identifying that the charging status of the battery satisfies a designated condition, transmit, through the communication module, a request for establishing a connection of short-range wireless communication to the designated external electronic device based on identifying a state in which the connection of the short-range wireless communication with the designated external electronic device is released, and transmit charging-related information about the battery to the designated external electronic device through the communication module based on the connection of the short-range wireless communication with the designated external electronic device.

According to various embodiments, the processor may be further configured to identify a charging-related event and identify the charging status based on the identified charging-related event.

According to various embodiments, the electronic device may include an electronic device to be worn on an ear or an electronic device to be worn on a wrist.

According to various embodiments, the at least one processor may identify that the connection of the short-range wireless communication is released in a state in which the electronic device is mounted on a cradle.

According to various embodiments, the at least one processor may be further configured to allow the electronic device to transmit a request for establishing a connection of short-range wireless communication to the designated external electronic device through the cradle.

According to various embodiments, the short-range wireless communication may include at least one of Bluetooth, Bluetooth low energy (BLE), Wi-Fi, or Wi-Fi direct.

According to various embodiments, the at least one processor may be configured to store identification information about the designated external electronic device and transmit a request for establishing a connection of short-range wireless communication to the designated external electronic device based on the identification information about the designated external electronic device.

According to various embodiments, the identification information about the designated external electronic device may include at least one of a device name, a universally unique identifier (UUID), or a manufacturer's data.

According to various embodiments, the at least one processor may identify that the designated condition is satisfied when the charging status is a designated level or more or a fully charged status.

According to various embodiments, the at least one processor may identify that the designated condition is satisfied when the charging status is a set level or less or a discharged status.

According to various embodiments, the at least one processor may be further configured to receive information corresponding to a charging status of a wearable device connected to the electronic device and identify a charging status of a battery included in the wearable device based on the received information corresponding to the charging status of the wearable device.

According to various embodiments, the electronic device may further comprise a battery. The at least one processor may be further configured to identify whether short-range wireless communication with a designated external electronic device is connected based on identifying that a charging status of the battery satisfies a designated condition.

A method for operating an electronic device, according to any one of various embodiments, may comprise identifying whether short-range wireless communication with a designated external electronic device is connected based on identifying that a charging status of the battery satisfies a designated condition, transmitting a request for establishing a connection of short-range wireless communication to the designated external electronic device based on identifying a state in which the connection of the short-range wireless communication with the designated external electronic device is released, and transmitting charging-related information about the battery to the designated external electronic device based on the connection of the short-range wireless communication with the designated external electronic device.

According to various embodiments, the method may further comprise identifying a charging-related event and identifying the charging status based on the identified charging-related event.

According to various embodiments, the electronic device may include an electronic device to be worn on an ear or an electronic device to be worn on a wrist.

According to various embodiments, the method may identify that the connection of the short-range wireless communication is released in a state in which the electronic device is mounted on a cradle.

According to various embodiments, the method may further comprise allowing the electronic device to transmit a request for establishing a connection of short-range wireless communication to the designated external electronic device through the cradle.

According to various embodiments, the short-range wireless communication may include at least one of Bluetooth, Bluetooth low energy (BLE), Wi-Fi, or Wi-Fi direct.

According to various embodiments, the method may further comprise storing identification information about the designated external electronic device and transmitting a request for establishing a connection of short-range wireless communication to the designated external electronic device based on the identification information about the designated external electronic device.

According to various embodiments, the identification information about the designated external electronic device may include at least one of a device name, a universally unique identifier (UUID), or a manufacturer's data.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:

a communication circuitry;

memory storing instructions; and at least one processor electrically connected to the communication circuitry, wherein the instructions, when executed by the at least one processor individually or collectively, cause the electronic device to:

identify a charging status;

based on the charging status satisfying a designated condition, identify whether short-range wireless communication is connected with a designated external device;

based on identifying that the connection of the short-range wireless communication with the designated external device is released, transmit, through the communication circuitry, a request for establishing a connection of the short-range wireless communication to the designated external device; and based on the connection of the short-range wireless communication with the designated external device being established, transmit charging-related information to the designated external device through the communication circuitry.

2. The electronic device of claim 1, wherein the instructions, when executed by the at least one processor, cause the electronic device to:

identify a charging-related event; and identify the charging status based on the identified charging-related event.

3. The electronic device of claim 1, wherein the electronic device is configured to be worn on an ear or on a wrist.

4. The electronic device of claim 3, wherein the instructions, when executed by the at least one processor, cause the electronic device to identify that the connection of the short-range wireless communication is released in a state in which the electronic device is mounted on a cradle.

5. The electronic device of claim 4, wherein the instructions, when executed by the at least one processor, cause the electronic device to enable the electronic device to transmit a request for establishing a connection of short-range wireless communication to the designated external device through the cradle.

6. The electronic device of claim 1, wherein the short-range wireless communication includes at least one of Bluetooth, Bluetooth low energy (BLE), Wi-Fi, or Wi-Fi direct.

7. The electronic device of claim 1, wherein the instructions, when executed by the at least one processor, cause the electronic device to:

store identification information about the designated external device; and based on the stored identification information about the designated external device, transmit a request for establishing a connection of short-range wireless communication to the designated external device.

8. The electronic device of claim 7, wherein the stored identification information about the designated external device includes at least one of a device name, a universally unique identifier (UUID), or a manufacturer's data.

9. The electronic device of claim 1, wherein the instructions, when executed by the at least one processor, cause the electronic device to identify that the designated condition is satisfied based on the charging status being at least a designated level.

10. The electronic device of claim 1, wherein the instructions, when executed by the at least one processor, cause the electronic device to identify that the designated condition is satisfied based on the charging status being less than or equal to a set level.

11. The electronic device of claim 1, wherein the instructions, when executed by the at least one processor, cause the electronic device to:

receive information corresponding to a charging status of a wearable device connected to the electronic device; and based on the received information corresponding to the charging status of the wearable device, identify a charging status of a battery included in the wearable device.

12. The electronic device of claim 1, further comprising a battery, wherein the instructions, when executed by the at least one processor, cause the electronic device to identify whether the short-range wireless communication is connected with the designated external device based on identifying that a charging status of the battery satisfies a designated condition.

13. A method for operating an electronic device and transmitting charging-related information about a battery in the electronic device, the method comprising:

based on identifying that a charging status of the battery satisfies a designated condition, identifying whether short-range wireless communication is connected with a designated external device;

based on identifying that the connection of the short-range wireless communication with the designated external device is released, transmitting, through a communication circuitry, a request for establishing a connection of the short-range wireless communication to the designated external device; and based on the connection of the short-range wireless communication with the designated external device being established, transmitting charging-related information about the battery to the designated external device.

14. The method of claim 13, further comprising:

identifying a charging-related event; and identifying the charging status based on the identified charging-related event.

15. The method of claim 13, wherein the electronic device is configured to be worn on an ear or on a wrist.

16. The method of claim 15, further comprising:

identifying that the connection of the short-range wireless communication is released in a state in which the electronic device is mounted on a cradle.

17. The method of claim 16, further comprising:

transmitting a request for establishing a connection of short-range wireless communication to the designated external device through the cradle.

18. The method of claim 13, wherein the short-range wireless communication includes at least one of Bluetooth, Bluetooth low energy (BLE), Wi-Fi, or Wi-Fi direct.

19. The method of claim 13, further comprising:

storing identification information about the designated external device; and based on the stored identification information about the designated external device, transmitting a request for establishing a connection of short-range wireless communication to the designated external device.

20. A non-transitory storage medium for storing computer-readable instructions which, when executed by at least one processor of an electronic device individually or collectively, cause the electronic device to perform operations, the operations comprising:

based on identifying that a charging status of a battery satisfies a designated condition, identifying whether short-range wireless communication is connected with a designated external device;

based on identifying that the connection of the short-range wireless communication with the designated external device is released, transmitting, through a communication circuitry, a request for establishing a connection of the short-range wireless communication to the designated external device; and based on the connection of the short-range wireless communication with the designated external device being established, transmitting charging-related information about the battery to the designated external device.

* * * * *